United States Patent
Dominguez Moreno et al.

(10) Patent No.: US 10,785,091 B2
(45) Date of Patent: Sep. 22, 2020

(54) COGNITIVE THERMAL CABLE HOLDER

(71) Applicant: International Business Machines Corporation, Armonk, NY (US)

(72) Inventors: Cesar A. Dominguez Moreno, Zapopan (MX); Ernesto Ramos Cacique, Zapopan (MX); Marco Antonio Ramos Ramirez, Tlaquepaque (MX); Gerardo Ortiz Cueva, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/042,058

(22) Filed: Jul. 23, 2018

(65) Prior Publication Data

US 2020/0028728 A1     Jan. 23, 2020

(51) Int. Cl.
    *G08B 21/00*      (2006.01)
    *H04L 12/24*      (2006.01)
    (Continued)

(52) U.S. Cl.
    CPC ............ *H04L 41/065* (2013.01); *G01K 1/024* (2013.01); *G01K 1/026* (2013.01); *G01N 25/72* (2013.01);
    (Continued)

(58) Field of Classification Search
    CPC . H04L 41/065; H04L 41/0686; H04L 41/069; H04L 41/142; G01K 1/024; G01K 1/026; G01N 25/72; H04Q 9/02
    (Continued)

(56) References Cited

U.S. PATENT DOCUMENTS 9,310,784 B1    4/2016   Roy
2005/0165586 A1*   7/2005   Moore .................... G06F 1/206
                                                       702/188

(Continued)

FOREIGN PATENT DOCUMENTS

CN      201364506 Y     12/2009
CN      106815590 A     6/2017

OTHER PUBLICATIONS

"Built in Smart Device Mount with Automatic Temperature Control", An IP.com Prior Art Database Technical Disclosure, Disclosed Anonymously, IP.com No. IPCOM000241503D, IP.com Electronic Publication Date: May 7, 2015, 3 pages.

(Continued)

*Primary Examiner* — Mark S Rushing
(74) *Attorney, Agent, or Firm* — Grant M. McNeilly

(57) ABSTRACT

According to some embodiments of the present disclosure, a computer-implemented method for managing a data center that is temperature controlled using a thermal management system is disclosed. The method includes collecting ambient temperature data in the data center, collecting server temperature data in servers located in the data center, collecting rack temperature data at server racks located in a data center using rack temperature sensors, wherein each rack temperature sensor is associated with one of the server racks, wherein at least one of the server racks includes at least two of the servers. The method further includes analyzing the ambient temperature data, the server temperature data, and the rack temperature data to discover a cause of a fault in the data center, wherein the cause is selected from the thermal management system, the servers, or the rack temperature sensors, and generating a notification regarding the cause of the fault.

16 Claims, 23 Drawing Sheets

(51) Int. Cl.
  *G01N 25/72* (2006.01)
  *G01K 1/02* (2006.01)
  *H04Q 9/02* (2006.01)
(52) U.S. Cl.
  CPC ........ *H04L 41/069* (2013.01); *H04L 41/0686* (2013.01); *H04L 41/142* (2013.01); *H04Q 9/02* (2013.01); *H04Q 2213/13162* (2013.01)
(58) Field of Classification Search
  USPC ........................................................ 340/518
  See application file for complete search history.

(56) References Cited

U.S. PATENT DOCUMENTS

| | | | | |
|---|---|---|---|---|
| 2008/0121171 | A1* | 5/2008 | Hulsey | G01K 11/12 116/216 |
| 2010/0127881 | A1* | 5/2010 | Schechter | H05K 7/20836 340/584 |
| 2010/0195694 | A1 | 8/2010 | Claassen | |
| 2014/0320308 | A1* | 10/2014 | Lewis | H04Q 9/00 340/870.07 |
| 2015/0280968 | A1* | 10/2015 | Gates | G06F 11/0709 714/37 |
| 2015/0342056 | A1* | 11/2015 | Ferrill | G06F 17/5068 716/137 |
| 2017/0262923 | A1 | 9/2017 | Bute | |

OTHER PUBLICATIONS

"Method and Apparatus for Flexible Cable Management in DataCenter", An IP.com Prior Art Database Technical Disclosure, Disclosed Anonymously, IP.com No. IPCOM000241422D, IP.com Electronic Publication Date: Apr. 25, 2015, 28 pages.

IBM, "Dynamic Thermal Mapping and Trend Analysis As a Control Mechanism for HVAC Systems in Data Centers", An IP.com Prior Art Database Technical Disclosure, IP.com No. IPCOM000135036D, Original Publication Date: Mar. 27, 2006, 3 pages.

Lawrence, et al., "Air/Cable Management Assembly", An IP.com Prior Art Database Technical Disclosure, IP.com No. IPCOM000112540D, Original Publication Date: May 1, 1994, 3 pages.

Mell et al., "The NIST Definition of Cloud Computing", National Institute of Standards and Technology, Special Publication 800-145, Sep. 2011, 7 pages.

Dominguez Moreno, et al., "Cognitive Thermal Cable Holder", U.S. Appl. No. 16/042,100, filed Jul. 23, 2018.

List of IBM Patents or Patent Applications Treated as Related. Filed Jul. 23, 2018. 2 pages.

* cited by examiner

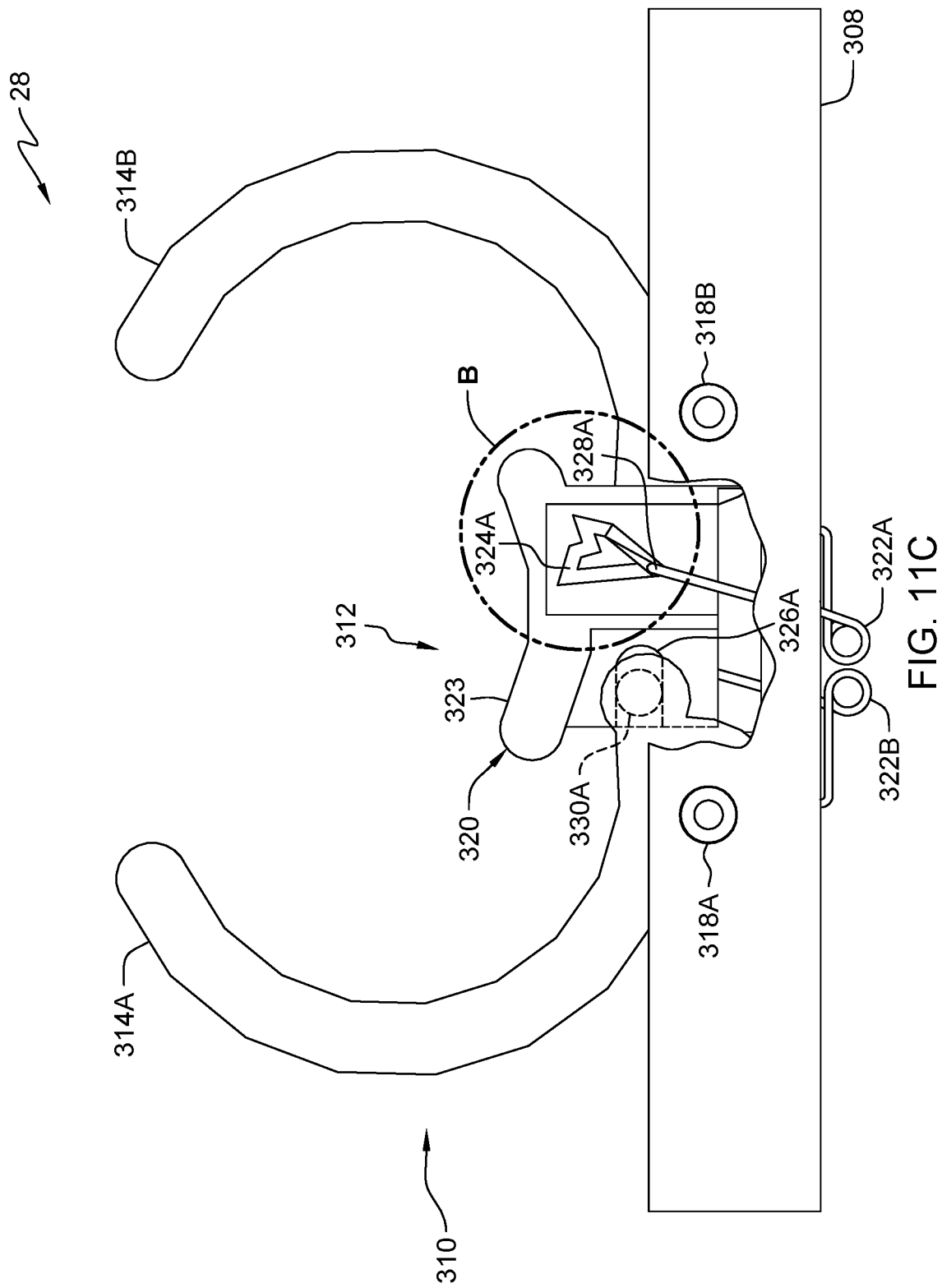

COGNITIVE THERMAL CABLE HOLDER

BACKGROUND

Embodiments of the present invention relate to temperature monitoring, and more specifically, to server room temperature management.

Many large computing infrastructures are implemented using an array of racks that each hold several servers. The racks are placed in a climate-controlled room in order to manage the heat generated from the operation of the electrical elements inside of the servers. This allows for the servers to operate efficiently and without undue wear-and-tear on their internal components.

SUMMARY

According to some embodiments of the present disclosure, a computer-implemented method for managing a data center that is temperature controlled using a thermal management system is disclosed. The method includes collecting ambient temperature data in the data center, collecting server temperature data in servers located in the data center, collecting rack temperature data at server racks located in a data center using rack temperature sensors, wherein each rack temperature sensor is associated with one of the server racks, wherein at least one of the server racks includes at least two of the servers. The method further includes analyzing the ambient temperature data, the server temperature data, and the rack temperature data to discover a cause of a fault in the data center, wherein the cause is selected from the thermal management system, the servers, or the rack temperature sensors, and generating a notification regarding the cause of the fault.

According to some embodiments of the present disclosure, a method of managing a data center including racks, some of the racks including at least one server, wherein an ambient temperature in the data center is controlled by a thermal management system is disclosed. The method includes measuring a server temperature in one of the servers, measuring a rack temperature at one of the racks that is associated with the server, and measuring the ambient temperature in the data center. The method further includes sending the server temperature, the rack temperature, and the ambient temperature to be analyzed in real-time to discover a cause of a fault related to the data center, wherein the cause is selected from the thermal management system, the servers, and the racks, and receiving a notification regarding the cause of the fault.

According to some embodiments of the present disclosure, an apparatus includes a body, a cable holder connected to the body, a temperature sensor connected to the body; and a transmitter connected to the body and communicatively connected to a third-party source of information about assets related to a data center wherein the data center includes a thermal management system.

The above summary is not intended to describe each illustrated embodiment or every implementation of the present disclosure. The present disclosure also contains additional embodiments, and all of the embodiments can be freely combined with each other if they are not mutually exclusive. While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 8 shows a cloud computing environment that the cognitive thermal cable holder could interact with and/or be a member of.

FIG. 11C shows a side view of the holder assembly of FIG. 10A in an opened position, with a broken-out section showing additional detail of the button assembly.

Figure 1A:
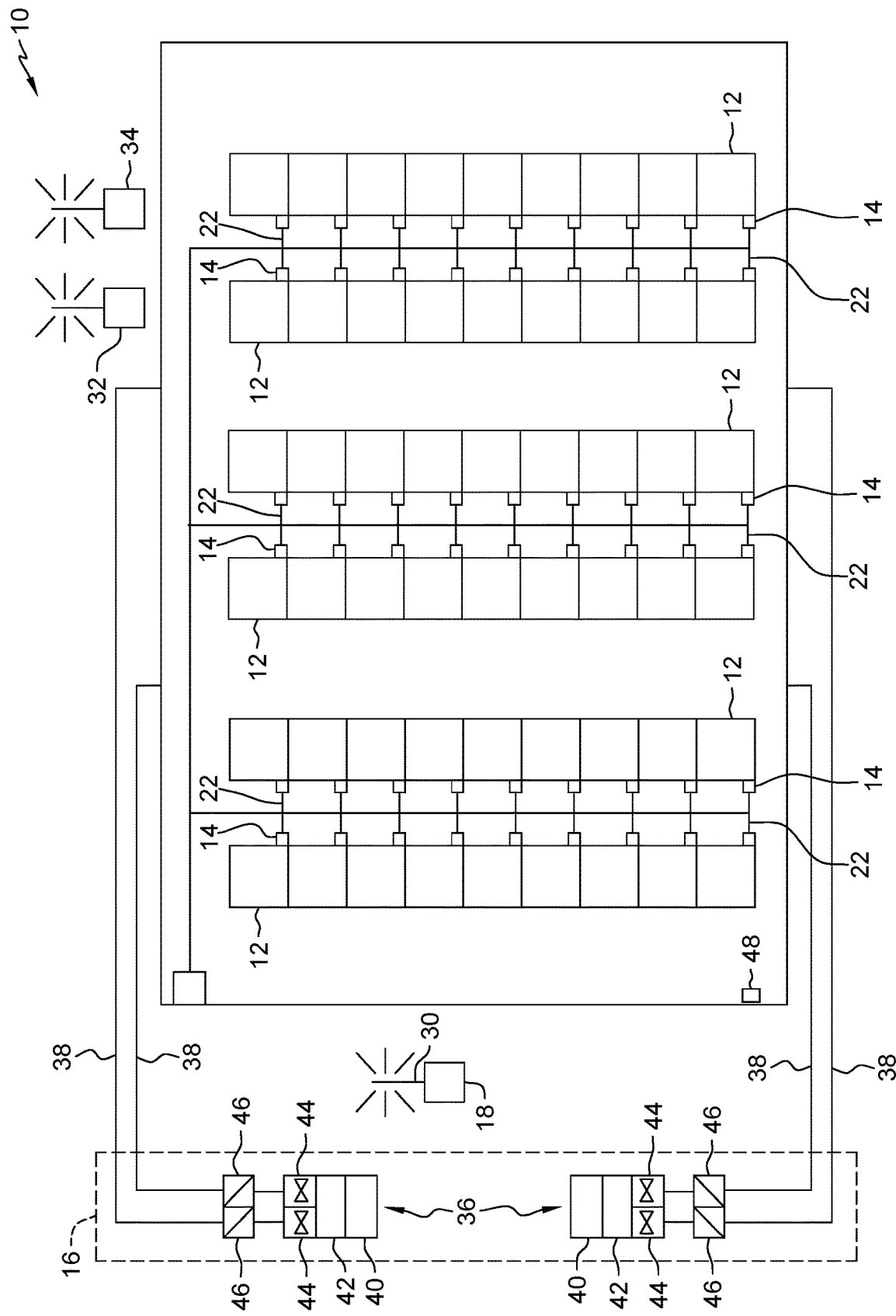
FIG. 1A shows a schematic view of a data center including a plurality of racks, a plurality of cognitive thermal cable holders, a thermal management system, and a processor.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of temperature monitoring, and, more specifically, to server room temperature management. While the present disclosure is not necessarily limited to such applications, various aspects of the disclosure may be appreciated through a discussion of various examples using this context.

A cognitive thermal cable holder (heretofore "holder") can be employed in a data center to provide information to an administrator of the data center and to organize items such as cords, cables, and fibers in the data center. In some embodiments, multiple holders can relay temperature information to a processor that can analyze it along with temperature information from other sources to detect a fault in the data center and determine the cause thereof. In some embodiments, the processor can receive specifications regarding a device associated with the data center, for example, an individual server and heating, ventilation, and air conditioning (HVAC) equipment. The processor can then search a third-party source of information, such as the internet, for information relating the device. If relevant information is found, for example, known service issues or newly released replacement devices, then the administrator can be notified. In some embodiments, the holder can organize long flexible members using claws. The claws have hooks that can be opened and closed by pushing a button.

Figure 1B:
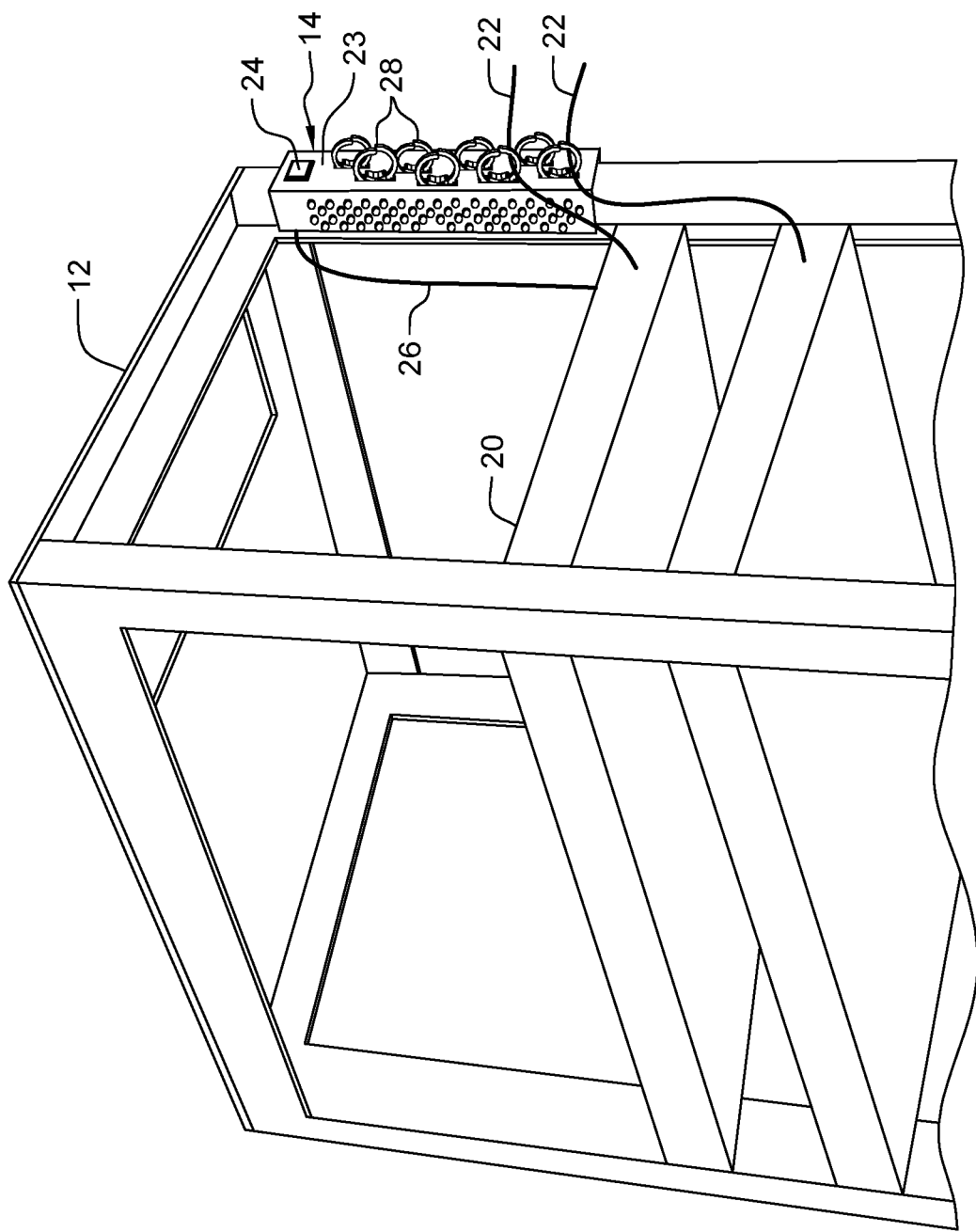
FIG. 1B shows a perspective view of a rack with a plurality of servers and a cognitive thermal cable holder.

Referring now to the figures, FIG. 1A shows a schematic view of data center 10 including a plurality of racks 12, a plurality of cognitive thermal cable holders 14, a thermal management system 16, and an assessor 18. FIG. 1B shows a perspective view of a rack 12 with a plurality of servers 20 and a cognitive thermal cable holder 14. FIGS. 1A and 1B will now be discussed simultaneously.

In the illustrated embodiment, data center 10 includes a plurality of racks 12 with at least some of the racks 12 including one or more servers 20 with cables 22. Attached to each rack 12 is a holder 14. Each holder 14 includes a body 23 with an electronics package 24 attached thereto. Electronics package 24 includes a temperature sensor and a transmitter that is powered from a server 20 via cord 26. In addition, each holder 14 includes a plurality of holder assemblies 28 connected to body 23 for holding cables 22.

In the illustrated embodiment, assessor 18 is positioned in data center 10, although in some embodiments, assessor 18 is external to data center 10. Assessor 18 is associated with transceiver 30 and can receive information, such as temperature data, from holders 14 since transceiver 30 includes a receiver. In addition, assessor 18 can communicate with third-party data source 32 and with system administrator 34 since transceiver 30 includes a transmitter.

In the illustrated embodiment, the environment inside of data center 10 is controlled by thermal management system 16. System 16 includes two units 36 and a plurality of ducts 38 to transport heated, cooled, and/or conditioned air to various locations in data center 10. Each unit 36 includes a heater 40, an air conditioner/cooler 42, and fans 44 to pull air through the unit 36 and push it through the ducts 38. Positioned in each duct 38 is a damper 46 that can further control the flow of air from units 36. In some embodiments, thermal management system 16 may include a liquid cooling circuit connected to each server 20. In such embodiments, holders 14 may be placed on the liquid cooling circuit to measure the temperatures thereof.

In the illustrated embodiment, data center 10 further includes temperature sensor 48 to measure the ambient temperature of the air in data center 10. Temperature sensor 48 is communicatively connected to assessor 18 so that assessor 18 receives the ambient temperature data. In other embodiments, data center 10 may include multiple temperature sensors 48 positioned in different locations in data center 10, the data from which can be averaged by assessor 18 to calculate an (average) ambient temperature of data center 10. In other embodiments, data center 10 may include multiple temperature sensors 48, which provide more local ambient temperatures of data center 10. In such embodiments, each temperature sensor 48 would be related to the proximate racks 14 and servers 20.

Furthermore, each server 20 includes at least one internal temperature sensor (not shown) that is communicatively connected to assessor 18. In some embodiments, there is a single temperature sensor inside of the case of the server 20. In some embodiments, there are multiple temperature sensors, each of which is mounted to a different component of the server, for example, on each core processor, on each hard drive, and on the motherboard.

During operation of data center 10, assessor 18 can collect ambient temperature data in real-time from temperature sensor 48, server temperature data from each of the plurality of servers 20, and rack temperature data from each of the plurality of holders 14. Assessor 18 can analyze all three types of data in real-time to discover if there is a fault in data center 10, and, if so, what the cause of the fault is (for example, whether it is related to thermal management system 16, servers 20, or holders 14). Assessor 18 can generate a notification regarding the fault and the cause of the fault and may send the notification to system administrator 34. In some embodiments, instead of or in addition to the notification, assessor 18 may take action on its own, for example, by adjusting the temperature set point of thermal management system 16.

In addition, in some embodiments, assessor 18 can collect data regarding a specification of a device related to data center 10, wherein the device may be at least one of a holder 14, a server 20, a heater 40, an air conditioner 42, a fan 44, or a damper 46. This data may be manually entered, for example, by system administrator 34, and/or this data may be collected from communication with the device itself. This data may include, for example, type of device; the manufacturer of the device; the model of the device; operating characteristics of the device, such as heat output; manufacture date of the device; entry into service date of the device; maintenance/service schedule of the device; and expected service life of the device. Based on the collected data and a clock, assessor 18 may send a notification to system administrator 34 that an action should be taken, for example, to prevent the device from failing. In addition to or in the alternative, the notification may be sent to a service provider associated with the device.

In some embodiments, assessor 18 can use the specification of the device to query third-party data source 32 for information about the device. Third-party data source 32 may be, for example, the Internet, and assessor 18 can seek information, for example, about service issues that other users have had (as reported on a forum) or newly released devices that could replace the current device (as listed on the device manufacturer's website). Assessor 18 can collect such information and formulate a notification to system administrator 34 and/or the service provider associated with the device. In some embodiments, each holder 14 includes its own assessor 18 (known as Internet of Things (IoT) holder 14', shown in FIG. 3B) that is able to query third-party data source 32 and/or notify system administrator 34. In such embodiments, each IoT holder 14' may omit its aforementioned transmitter because assessor 18 includes transceiver 30 (which has both a transmitter and receiver). In some embodiments, at least some of the holders 14 are IoT holders 14', and in such embodiments, there may be a master assessor 18' (shown in FIG. 3B) that communicates with each holder 14 and IoT holder 14'. Master assessor 18' may be a separate computer or one of the existing assessors 18 or IoT holders 14' may be master assessor 18'. In such embodiments, master assessor 18' may collect and process some or all of the three types of temperature data (i.e., ambient, rack, and server). In addition, the querying of third-party data source 32 may be performed by master assessor 18' alone, or it may be done by each assessor 18, with master assessor 18' querying on behalf of some or all of the holders 14 that do not include their own assessor 18.

The components and configuration of data center 10 allow for servers 20 to perform computing functions while being in a temperature-controlled environment with real-time monitoring. This monitoring can be used, for example, to optimize thermal management system 16 and to alert system administrator 34 and/or a service provider in case there is a fault in data center 10. In addition, assessor 18 can alert system administrator 34 and/or a service provider to potential problems that may occur (that have not yet occurred) or new equipment that is available for upgrading data center 10.

Figure 2:
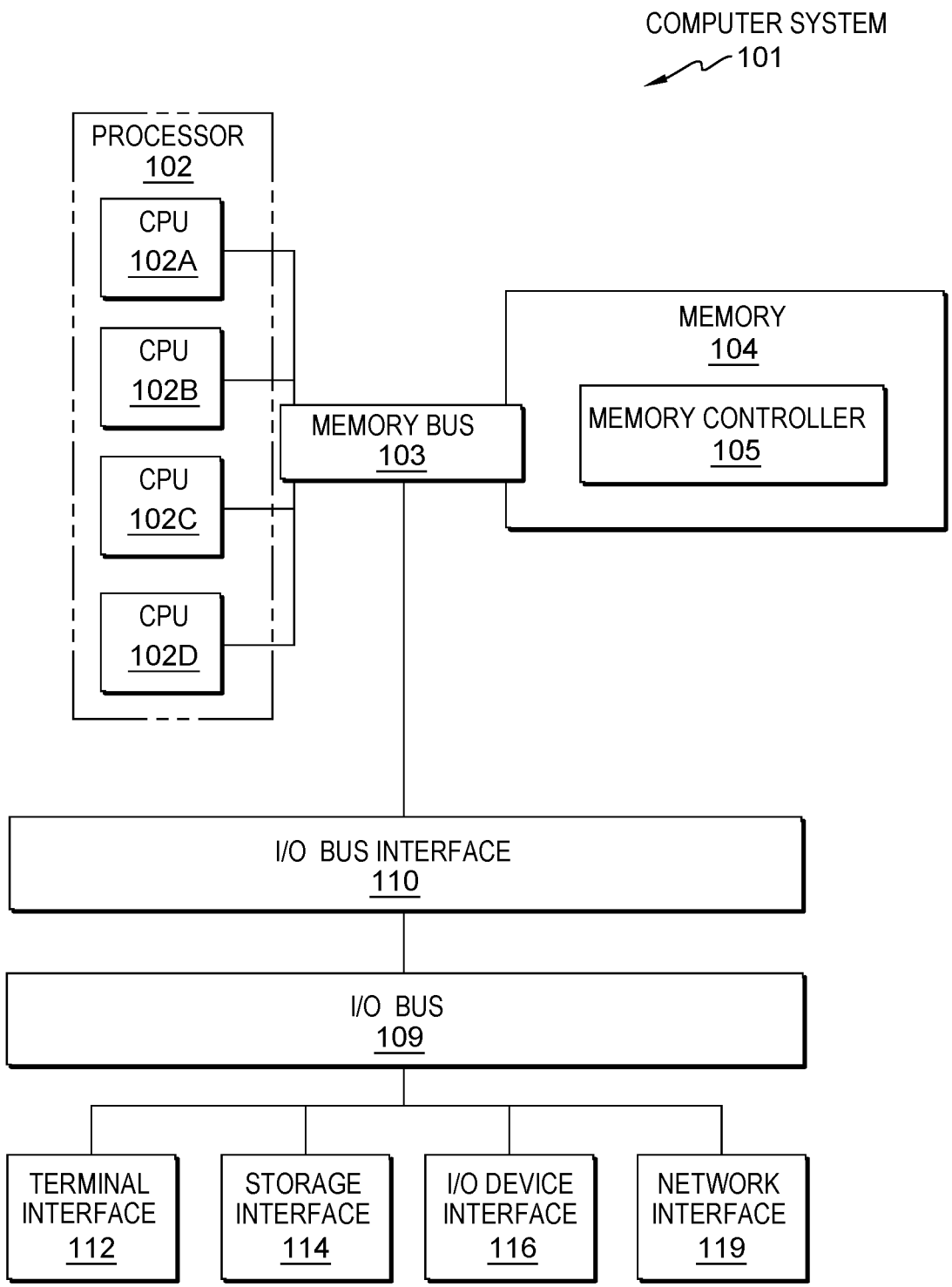
FIG. 2 shows a high-level block diagram of an example computer system that may be used in implementing embodiments of the present disclosure.

Referring now to FIG. 2, shown is a high-level block diagram of an example computer system (i.e., computer) 101 that may be used in implementing one or more of the methods or modules, and any related functions or operations, described herein (e.g., using one or more processor circuits or computer processors of the computer), in accordance with embodiments of the present disclosure. For example, a server or servers 20 and/or assessor 18 may have the components and configuration of computer system 101. In some embodiments, the major components of the computer system 101 may comprise one or more CPUs 102, a memory subsystem 104, a terminal interface 112, a storage interface 114, an I/O (Input/Output) device interface 116, and a network interface 119, all of which may be communicatively coupled, directly or indirectly, for inter-component communication via a memory bus 103, an I/O bus 109, and an I/O bus interface unit 110.

The computer system 101 may contain one or more general-purpose programmable central processing units (CPUs) 102A, 102B, 102C, and 102D, herein generically referred to as the processer 102. In some embodiments, the computer system 101 may contain multiple processors typical of a relatively large system; however, in other embodiments the computer system 101 may alternatively be a single CPU system. Each CPU 102 may execute instructions stored in the memory subsystem 104 and may comprise one or more levels of on-board cache.

In some embodiments, the memory subsystem 104 may comprise a random-access semiconductor memory, storage device, or storage medium (either volatile or non-volatile) for storing data and programs. In some embodiments, the memory subsystem 104 may represent the entire virtual memory of the computer system 101, and may also include the virtual memory of other computer systems coupled to the computer system 101 or connected via a network. The memory subsystem 104 may be conceptually a single monolithic entity, but, in some embodiments, the memory subsystem 104 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 104 may contain elements for control and flow of memory used by the processor 102. This may include a memory controller 105.

Although the memory bus 103 is shown in FIG. 2 as a single bus structure providing a direct communication path among the CPUs 102, the memory subsystem 104, and the I/O bus interface 110, the memory bus 103 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 110 and the I/O bus 109 are shown as single respective units, the computer system 101 may, in some embodiments, contain multiple I/O bus interface units 110, multiple I/O buses 109, or both. Further, while multiple I/O interface units are shown, which separate the I/O bus 109 from various communications paths running to the various I/O devices, in other embodiments some or all of the I/O devices may be connected directly to one or more system I/O buses.

In some embodiments, the computer system 101 may be a multi-user mainframe computer system, a single-user system, or a server computer or similar device that has little or no direct user interface, but receives requests from other computer systems (clients). Further, in some embodiments, the computer system 101 may be implemented as a desktop computer, portable computer, laptop or notebook computer, tablet computer, pocket computer, telephone, smart phone, mobile device, or any other appropriate type of electronic device.

It is noted that FIG. 2 is intended to depict the representative major components of an exemplary computer system 101. In some embodiments, however, individual components may have greater or lesser complexity than as represented in FIG. 2, components other than or in addition to those shown in FIG. 2 may be present, and the number, type, and configuration of such components may vary.

Figure 3A:
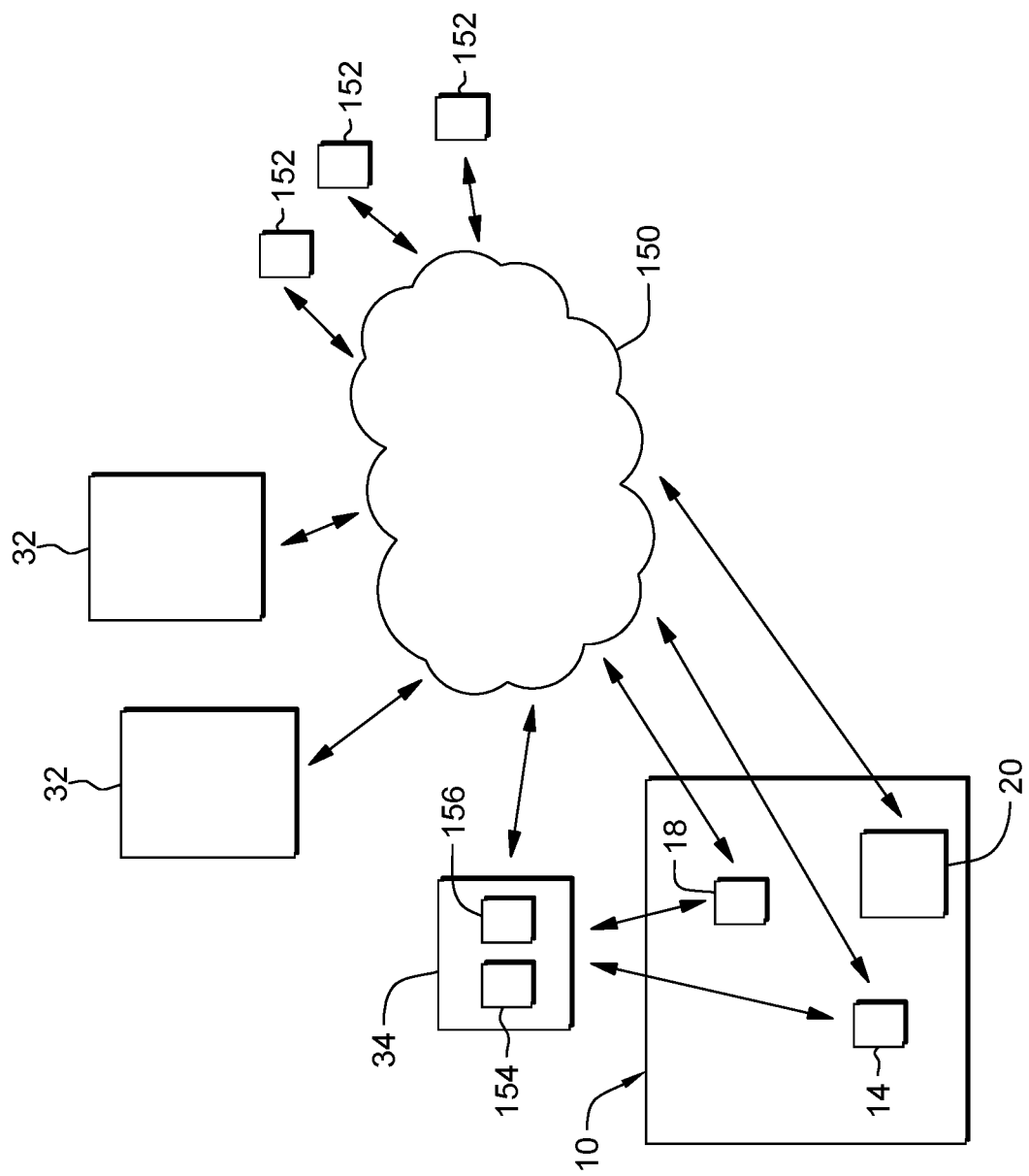
FIG. 3A shows a system diagram for communicating with third-party sources of information about devices associated with the data center.
Figure 3B:
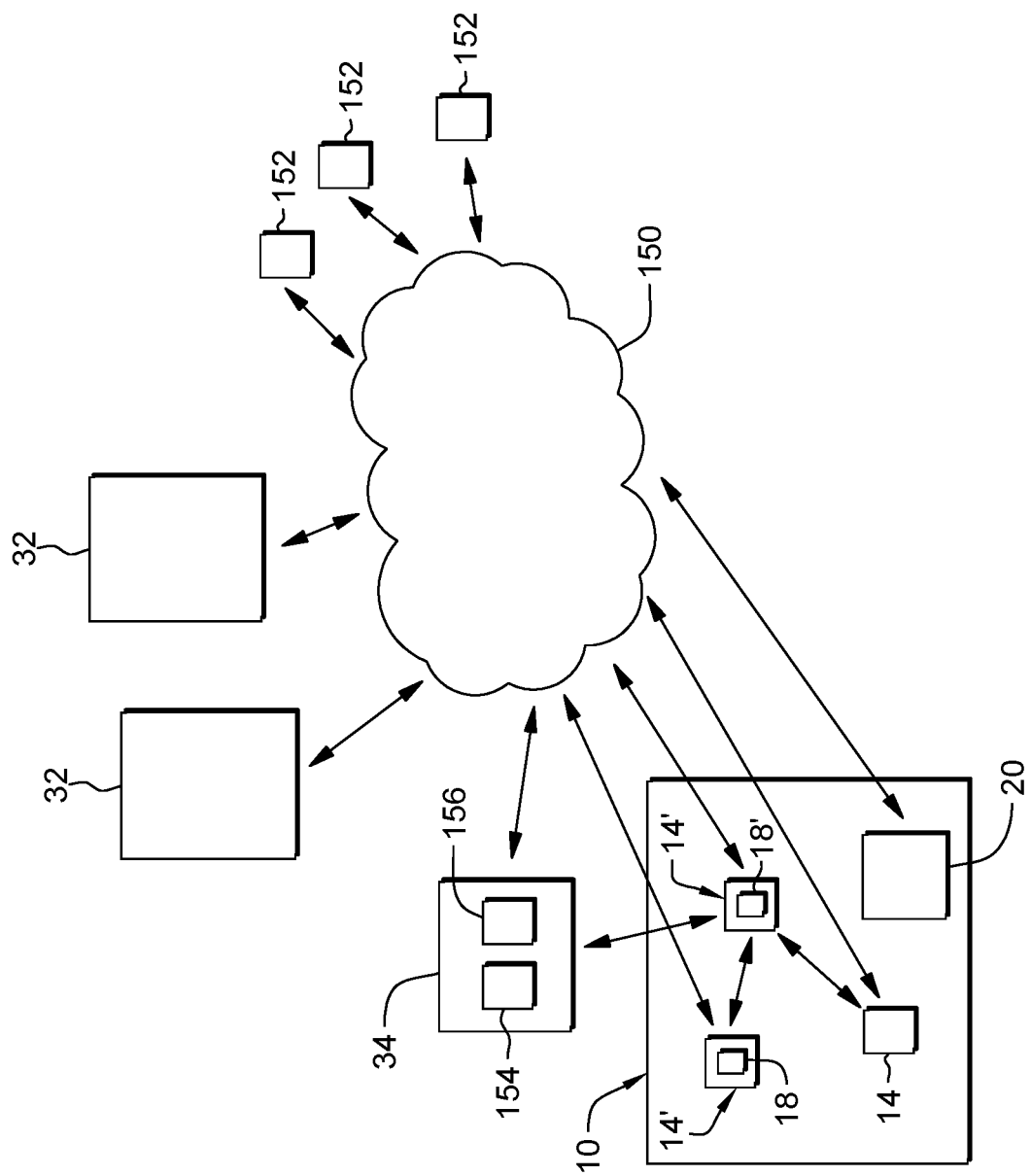
FIG. 3B shows an alternate embodiment system diagram for communicating with third-party sources of information about devices associated with the data center.

FIG. 3A shows a system diagram for communicating with third-party data sources 32 about devices associated with data center 10, and FIG. 3B shows an alternate embodiment system diagram. In some embodiments, one or more IoT holders 14' and/or assessors 18 are connected to network 150. Each IoT holder 14' and assessor 18 has the ability to send and receive real-time data over network 150. In the illustrated embodiment, such a system includes two third-party data sources 32A and 32B, and one IoT holder 14', and one assessor 18 (since not all of holders 14 in data center 10 may include their own assessor 18).

In the illustrated embodiments, network 150 can be implemented using any number of any suitable communications media. For example, network 150 may be a wide area network (WAN), a local area network (LAN), the Internet, or an intranet. In some embodiments, network 124 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (such as servers 20) including smart devices 152 in the Internet of Things (e.g., hundreds or thousands of computers or more, including IoT holders 14' and assessors 18) and those disposed within one or more data centers (such as data center 10) or homes or other locations and configured to share resources over network 150. For example, a smart device may be an electronic device that may be able to connect to other devices or networks via different protocols, including Bluetooth, near field communication (NFC), WiFi, or others. A smart device may also be able to operate to some extent interactively and autonomously.

In some embodiments, third-party data sources 32A and 32B may be accessed by IoT holder 14' and/or assessor 18 via network 150 (as shown) or directly (not shown). Third-party data sources 32A and 32B may include, for example, websites, databases, and/or other accessible data sources. In some embodiments, IoT holder 14' and/or assessor 18 may analyze the results of the querying of third-party data sources 32A and/or 32B. In some embodiments, IoT holder 14' and/or assessor 18 may analyze some or all of the three types of the collected temperature data. In some embodiments, some or all of the analysis of the query results and/or temperature data may be delegated by IoT holder 14' and/or assessor 18 to another processor that is in or connected to network 150.

In addition, IoT holder 14' and/or assessor 18 may communicate with system administrator 34 directly or via network 150. Thereby, IoT holder 14' and/or assessor 18 may send notifications to system administrator 34 regarding faults and causes of faults in data center 10. In some embodiments, system administrator 34 may be a user 154 with a user device 156. User device 156 may be a smart phone, tablet, laptop computer, desktop computer, or other device.

Figure 4:
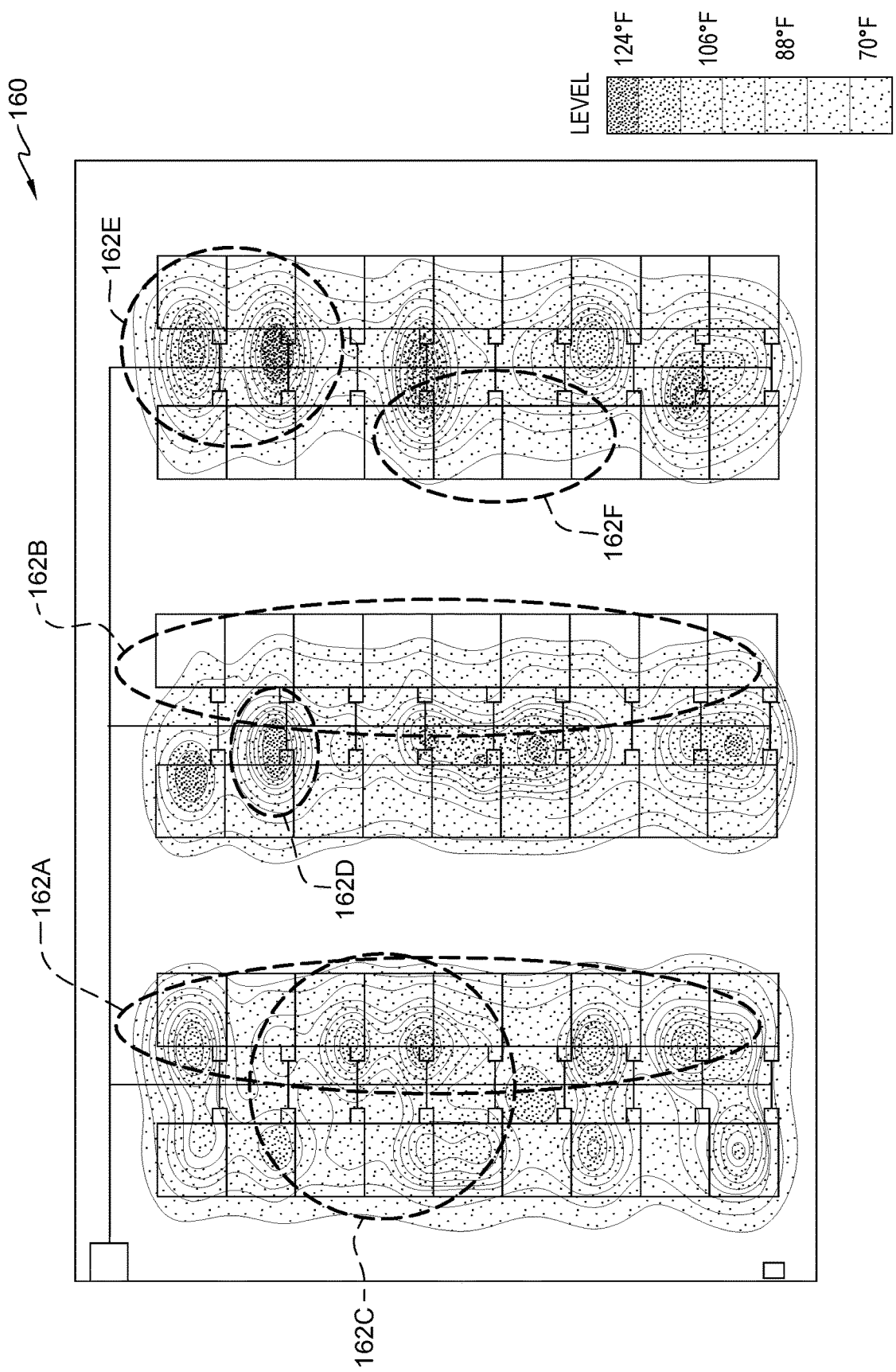
FIG. 4 shows a graphical thermal map of rack temperatures in the data center.

FIG. 4 shows graphical thermal map 160 of rack temperatures in data center 10 (shown in FIG. 1A). In the illustrated embodiment, the temperature data from holders 14 (shown in FIG. 1A) is plotted geographically, with interpolation having been done to represent the likely thermal conditions between holders 14. The data processing used to make and/or update (possibly in real-time) map 160 may be performed, for example, by an assessor 18 and/or system administrator 34 (shown in FIG. 1A). Map 160 may then be displayed for and/or by system administrator 34. In some embodiments, map 160 is made using server temperature data and/or ambient temperature data in addition to or instead of rack temperature data.

In the illustrated embodiment, a plurality of zones 162 are present on map 160. These zones 162 may or may not be present on map 160 as seen and/or displayed by system administrator 34. For the discussion of map 160 herein, zones 162 denote some areas of map 160 where certain conditions may exist at an exemplary time. While map 160 displays temperature information, map 160 may or may not include data relating to the number and locations of servers 20 (shown in FIG. 1B) or the activity thereof, which can affect the temperature inside of data center 10 at least locally.

In addition, the description of map 160 will include relative terms, such as cool or overcooled for a region with little to no heat-generating activity and/or excessive cooling; warm for a region with normally-functioning equipment and proper cooling; and hot or overheated for a region with failed equipment, too much heat-generating activity, and/or insufficient cooling. These terms may correspond to various different absolute temperature values depending on the specific environment of data center 10, the thermal management system 16 (shown in FIG. 1A) being employed, the servers 20 operating in data center 10, and the method of cooling servers 20.

In the illustrated embodiment, zone 162A indicates a region where there are a significant number and even distribution of operating servers 20, possibly to the extent that each rack 12 (shown in FIG. 1A) is full to capacity. In contrast, zone 162B indicates a region where there is an insignificant number of operating servers 20, possibly to the extent that each rack 12 is devoid of servers 20. In addition, zones 162C-162F include a typical density of operating servers 20 in data center 10, which may be similar to the distribution in zone 162A, 162B, or somewhere in between. While the locations and activity of servers 20 may already be known by system administrator 34, this information may also be displayed on thermal map 160.

At the exemplary time, thermal map 160 indicates that zone 162A is a warm region and zone 162B is a cool region. Furthermore, zone 162C indicates a warm region; zone 162D indicates a relatively small, very hot region; zone 162E indicates a relatively large, hot region; and zone 162F indicates a relatively large, cold region. Thereby, map 160 allows system administrator 34 (shown in FIG. 3) an opportunity to assess the conditions and operation of data center 10. For example, due to the server-occupancy/activity and temperatures of zones 162A-162C, system administrator 34 may decide that there are no faults in zones 162A-162C.

In contrast, system administrator 34 may decide that there are faults in data center 10 due to the server-occupancy/activity and temperatures of zones 162D-162F. More specifically, zone 162D may be decided to have an overheated server 20; zone 162E may be decided to be a "hot spot", which is an insufficiently cooled portion of data center 10; and zone 162F may be decided to be "cold spot", which is an overcooled portion of data center 10.

Figure 5A:
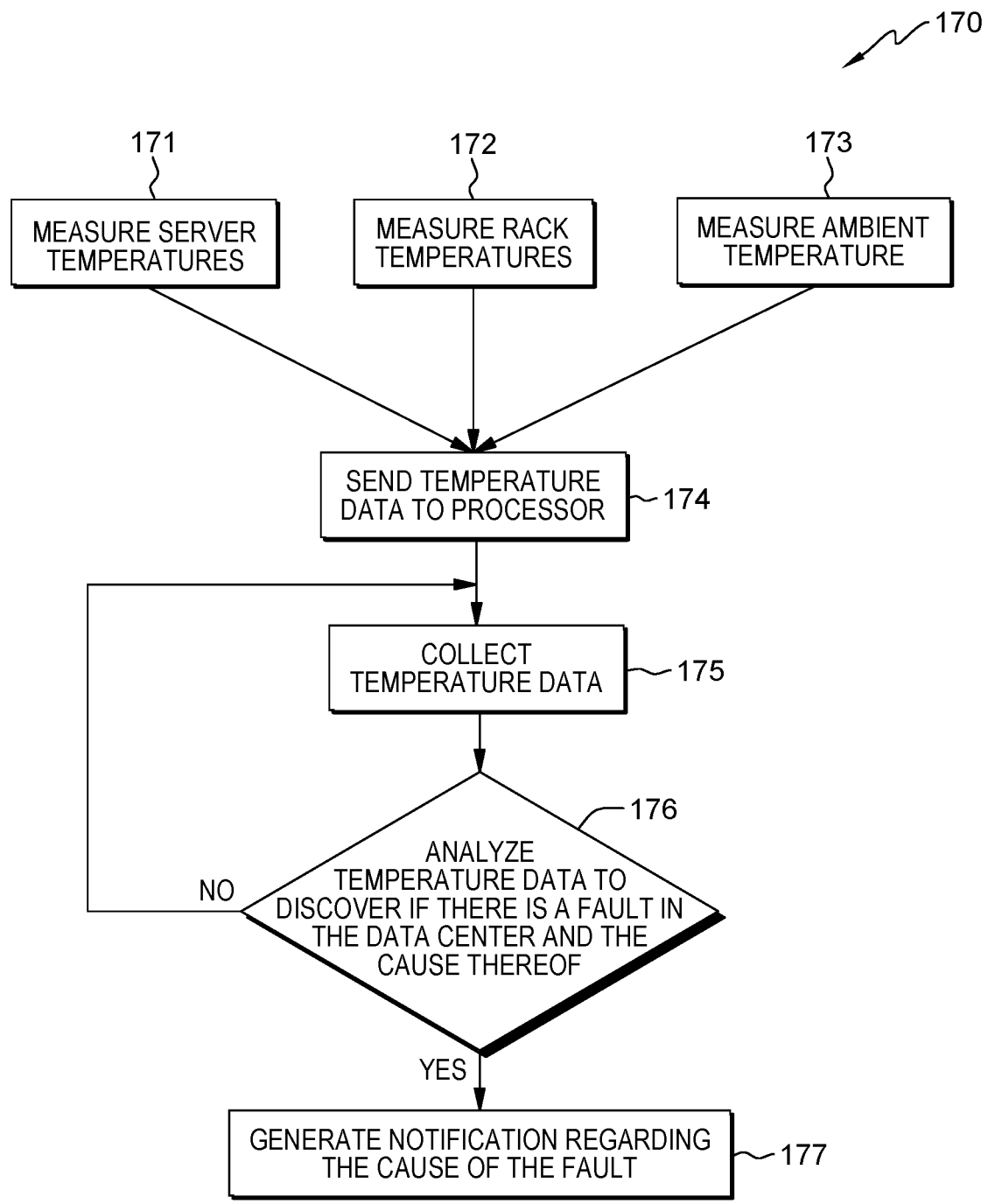
FIG. 5A shows a flowchart of a method of managing a data center.

FIG. 5A shows a flowchart of method 170 of managing data center 10. In the illustrated embodiment, the server 20 temperatures are measured, the rack 12 temperatures are measured (by holders 14), and the ambient temperature is measured at steps 171, 172, and 173, respectively. At step 174, the temperature data is sent to a processor, such as IoT holder 14' or assessor 18, and at step 175, the temperature data is collected by the processor. At step 176, the temperature data is analyzed by the processor to discover if there is a temperature anomaly in data center 10 that indicates a fault. If there is, then the temperature data is used to determine a cause of the fault at step 176. At step 177, a notification may be generated and sent to system administrator 34.

Figure 5B:
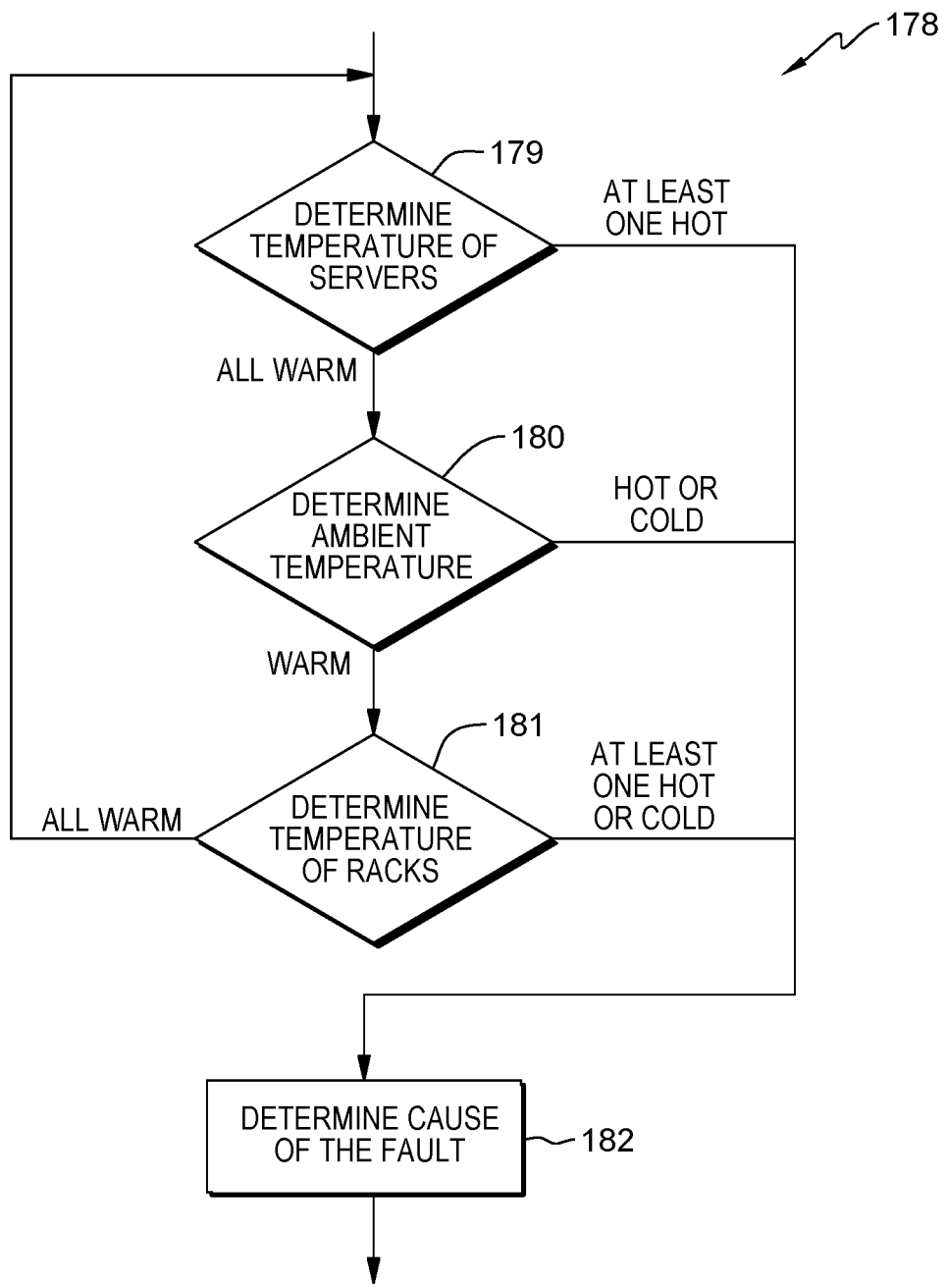
FIG. 5B shows a flowchart of a method of analyzing temperature data within the method of FIG. 5A.

FIG. 5B shows a flowchart of method 178 of analyzing temperature data from data center 10. Method 178 may be a portion or all of step 176 in method 170 (shown in FIG. 5A).

In the illustrated embodiment, whether any of the server temperatures is warm or hot is determined at step 179. Step 179 may include a comparison of the server temperature data related to each server with the corresponding server specification to determine whether a particular server (or servers) is warm or hot. At step 180, whether the ambient temperature is cold, warm, or hot is determined. At step 181, whether any of the rack temperatures is cold, warm, or hot is determined. A result other than warm for any of steps 179-181 may indicate a temperature anomaly and thus a fault with data center 10. A fault may be considered to be a condition or property of a device or devices related to data center 10 that is detrimental to the operation of data center 10. In some instances, a fault may be a complete failure of a piece of equipment, or it may merely be a substantial degradation of a piece of equipment. In some instances, a fault is a flaw in the design or selection of components related to data center 10. Therefore, it is beneficial to prevent, mitigate, or remedy faults in data center 10.

In the illustrated embodiment, if a fault has been detected, the cause of the fault is determined at step 182 using, for example, a troubleshooting table that includes various situations that may be described using combinations of server temperatures, ambient temperatures, and rack temperatures. There may be a corresponding cause of the fault and/or recommended action to take associated with some or all of the situations. The causes of the faults may be associated with thermal management system 16, one or more holders 14/14', or one or more servers 20.

FIGS. 6A-6F show some exemplary situations 184-189, respectively, that may be included in the troubleshooting table used in step 182 of method 178 (shown in FIG. 5B). In FIGS. 6A-6F, one server temperature and the corresponding rack temperature is represented, although method 178 may be performed iteratively for every server 20 and every rack 12 in data center 10. In addition, multiple situations 184-188 and/or multiple instances of situations 184-188 may be present at a given time in different areas of data center 10. As shown in FIGS. 6A-6F, cold, warm, and hot temperature bands are shown for ambient temperature and rack temperature, and warm and hot temperature bands are shown for server temperature. The relative values of the cold, warm, and hot temperature bands are indicated, and the value of each temperature is indicated by an "X" in each situation 184-188.

Figure 6A:
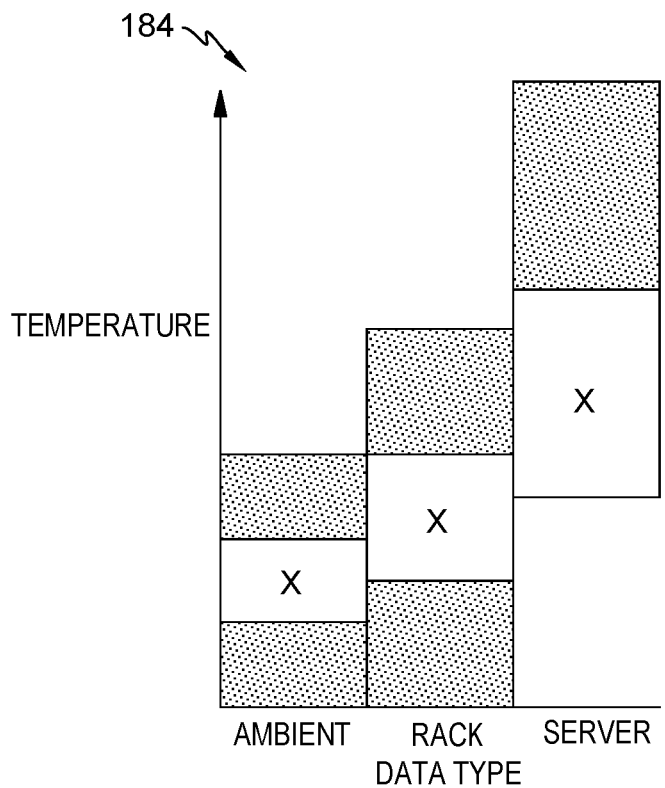
FIGS. 6A-6F show some exemplary situations with different temperature measurements in the data center.

In the example of FIG. 6A, situation 184 is shown. Situation 184 is when the ambient temperature, the rack temperature, and the server temperature are all warm. Therefore, situation 184 may be interpreted as lacking a thermal anomaly without a fault being present.

Figure 6B:
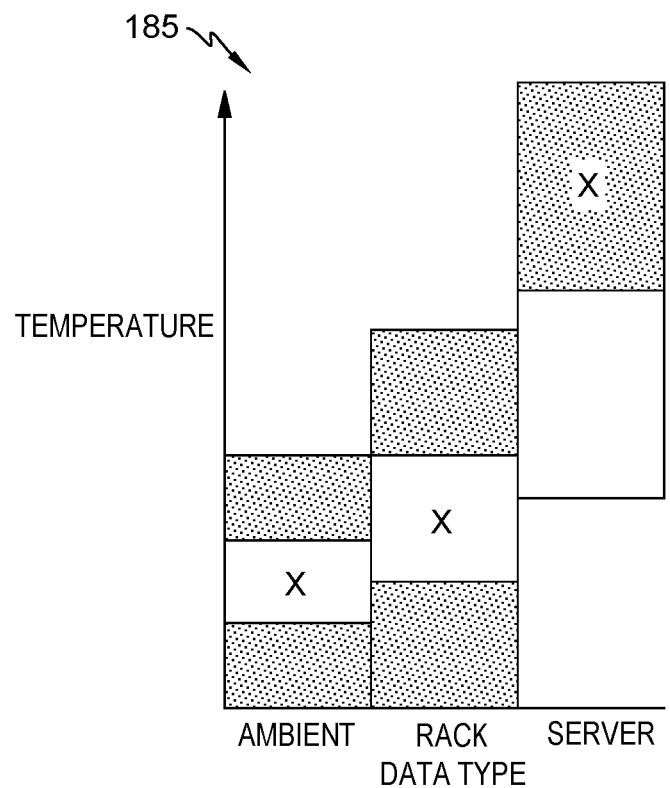

In the example of FIG. 6B, situation 185 is shown. Situation 185 is when the ambient temperature and the rack temperature are warm, but the server temperature is hot. Therefore, situation 185 may be interpreted as including a thermal anomaly with a fault being present, the cause of which is a malfunction of that server 20. A recommended action may be to analyze that server 20 for malfunctions that may have caused the thermal anomaly.

Figure 6C:
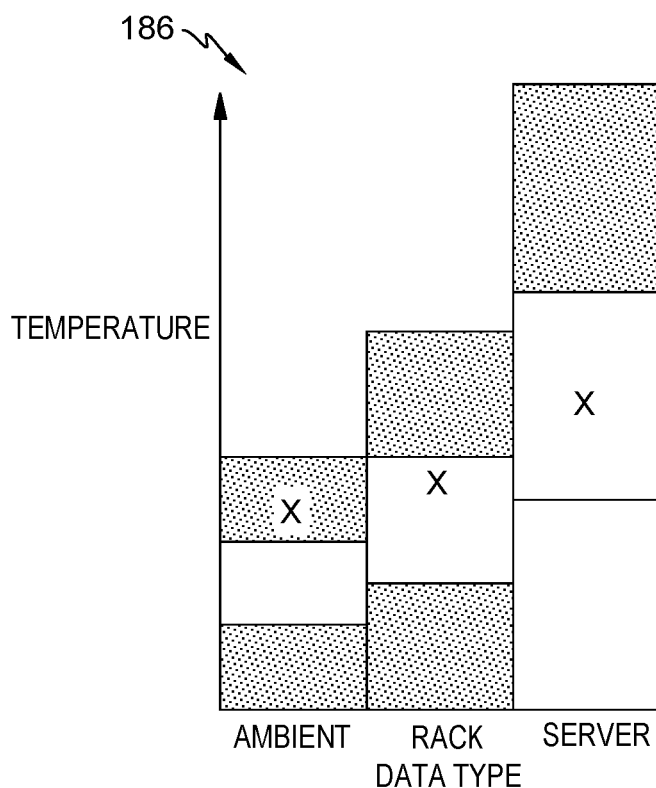

In the example of FIG. 6C, situation 186 is shown. Situation 186 is when the rack temperature and the server temperature are warm, but the ambient temperature is hot. Therefore, situation 186 may be interpreted as including a thermal anomaly with a fault being present, the cause of which is a malfunction of thermal management system 16. A recommended action may be to investigate the devices in thermal management system 16 (e.g., ducts 38, heaters 40, air conditioner/cooler 42, fans 44, dampers 46, temperature sensor 48) and repair or replace one or more devices therein.

Figure 6D:
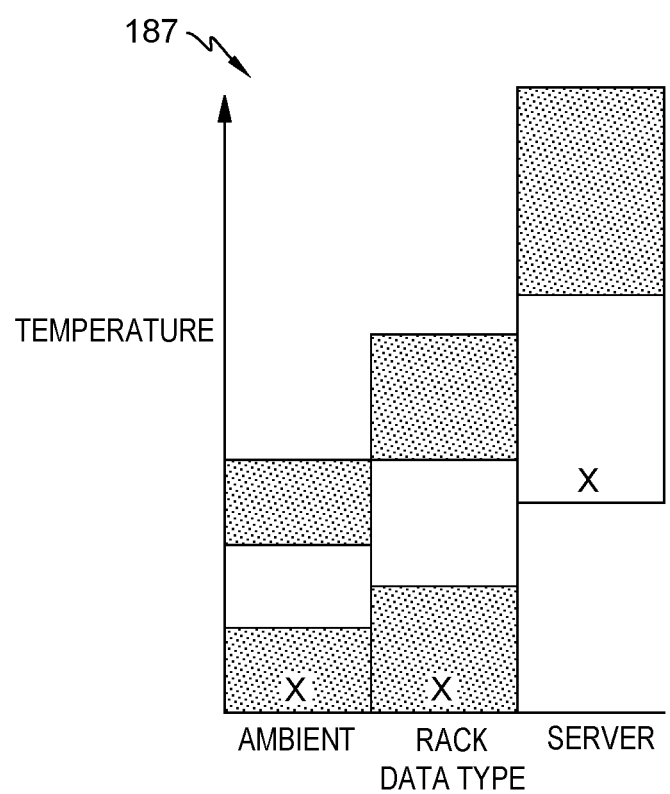

In the example of FIG. 6D, situation 187 is shown. Situation 187 is when the ambient temperature and the rack temperature are cold, but the server temperature is warm. Therefore, situation 187 may be interpreted as including a thermal anomaly with a fault being present, the cause of which is an optimization opportunity for thermal management system 16. The specific fault may be an overcooling of data center 10 (for example, when there is significant idleness in many of servers 20). A recommended action may be to increase the set point temperature of thermal management system 16, decreasing the energy usage and increasing the efficiency of data center 10 while still maintaining appropriate ambient, rack, and server temperatures. Similarly, the opposite situation (not shown) may exist where the ambient and rack temperatures are cold but the server temperature is warm (which can be considered an undercooling of data center 10). Such a situation may indicate a fault with the cause being thermal management system 16, wherein a recommended action is to decrease the set point temperature of thermal management system 16.

Figure 6E:
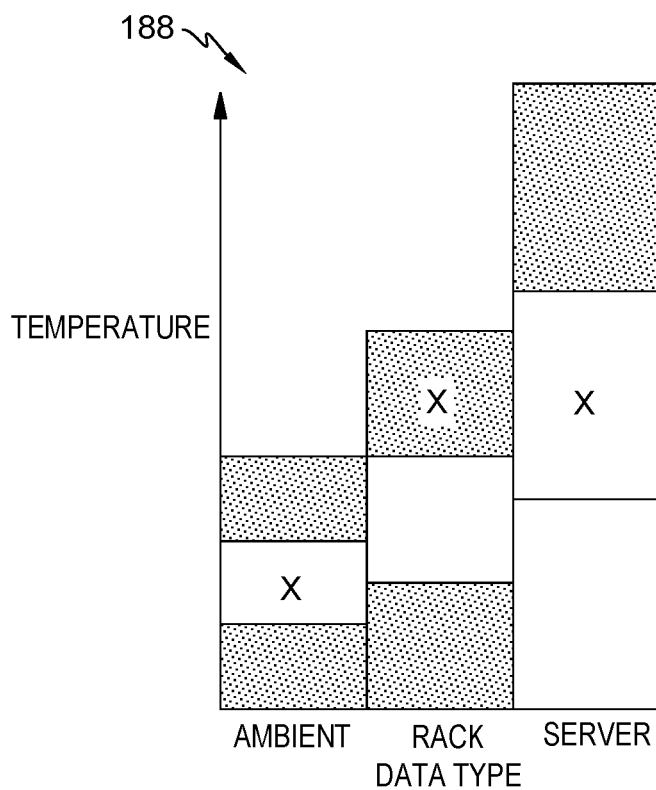

In the example of FIG. 6E, situation 188 is shown. Situation 188 is when the ambient temperature and the server temperature are warm, but the rack temperature is hot. Therefore, situation 188 may be interpreted as including a thermal anomaly with a fault being present, the cause of which is an optimization opportunity for thermal management system 16. The specific fault may be a "hot spot" in data center 10. A recommended action may be to investigate the devices in thermal management system 16, for example, to find an incorrect configuration of duct(s) 38, an air conditioner/cooler 42 that is failing or has failed, a fan 44 that is failing (or has failed) and is not moving enough air, and/or an incorrectly adjusted damper 46. Remedying or mitigating the fault may increase the efficiency of data center 10 while still maintaining appropriate ambient, rack, and server temperatures.

Figure 6F:
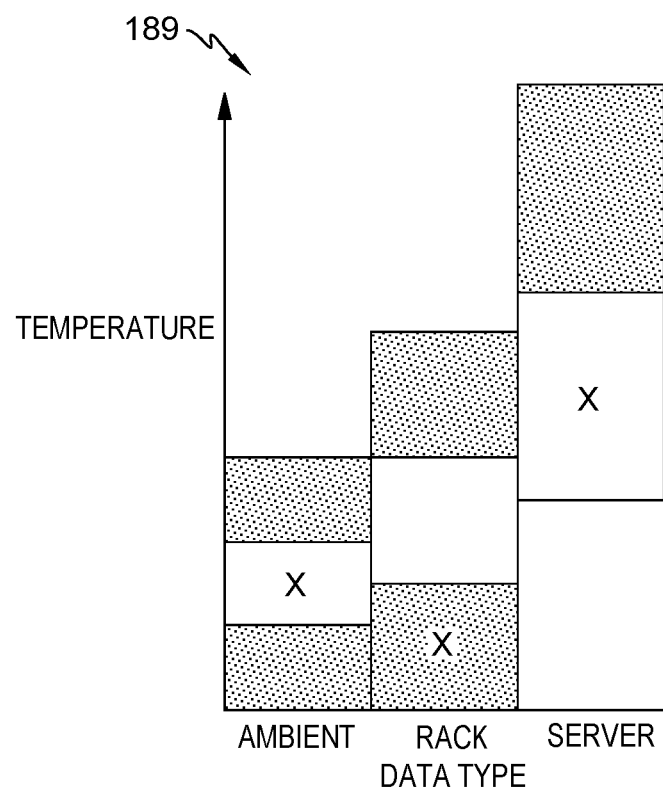

In the example of FIG. 6F, situation 189 is shown. Situation 189 is when the ambient temperature and the server temperature are warm, but the rack temperature is cold. Therefore, situation 189 may be interpreted as including a thermal anomaly with a fault being present, the cause of which is an optimization opportunity for thermal management system 16. The specific fault may be a "cold spot" in data center 10. A recommended action may be to investigate the devices in thermal management system 16, for example, to find an incorrect configuration of duct(s) 38, a heater 40 that is failing or has failed, a fan 44 that is failing (or has failed) and is not moving enough air, and/or an incorrectly adjusted damper 46. Remedying or mitigating the fault may increase the efficiency of data center 10 while still maintaining appropriate ambient, rack, and server temperatures.

Figure 7:
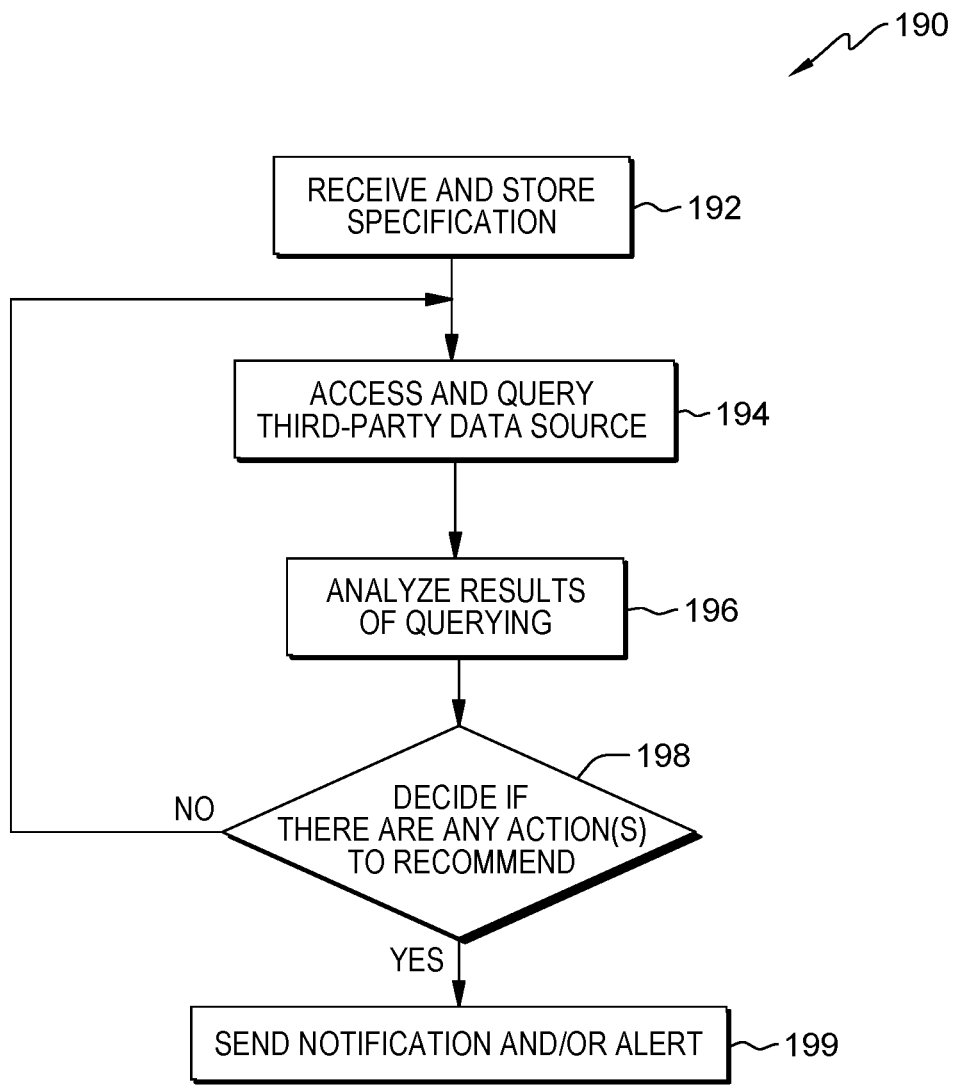
FIG. 7 shows a flow diagram of a method for making a recommendation regarding a device related to the data center.

FIG. 7 shows a flow diagram of method 190 for making a recommendation regarding a device related to data center 10. Some of the components and actions of method 190 were discussed previously with respect to FIG. 3. For example, method 190 may be performed by, for example, one or more IoT holders 14' and/or assessors 18 in data center 10 (which can be referred to as "the performer(s)").

In some embodiments, at step 192, the performer receives and stores a specification of the device. At step 194, the performer accesses at least one third-party data source 32 and queries that third-party data source 32 for information about the device. The querying may occur, in part, by the performer using the specification to identify the subject of the information being sought after. In addition, the querying may be directed toward more than one third-party data source 32. At step 196, the performer analyzes the results of the querying from third-party data source(s) 32. At step 198, the performer decides if there are any action(s) that can be recommended to be taken to prevent, mitigate, and/or remedy a fault or potential fault in data center 10 related to the device. If there are, at step 199, the performer sends a notification and/or alert to system administrator 34 that includes action(s) that could be taken regarding the device, if appropriate.

In some embodiments, method 190 is performed according to a time-based schedule. In some embodiments, method 190 is performed at the behest of system administrator 34. In some embodiments, method 190 is performed after a fault has been detected in data center 10. In some embodiments, method 190 is performed after a cause of a fault in data center 10 has been assigned. In some embodiments, there are multiple possible triggers for performing method 190. Overall, method 190 allows for data center 10 to gather information about its own components such that data center 10 can alert system administrator 34 of actions that could be taken to allow data center 10 to be operated with limited or no disruptions.

Some embodiments of the present invention perform real-time monitoring of data center 10. In some embodiments, specific rules are applied to the data to determine the presence and cause of a fault. In some embodiments, specific rules are applied to the cause of the fault to generate a notification and/or recommend possible action(s) to take in order to maintain, restore, and/or improve the function of data center 10. In some embodiments, actions are taken to find information from third-party sources that may assist to maintain, restore, and/or improve the function of data center 10.

The additional rack temperature data provided by some embodiments of the present invention allow for temperature anomalies in data center 10 to be discovered and described in greater detail in real-time. This allows for not only the automated identification of faults, but also the automated, rapid, and efficient assignment causes for faults. In addition, in some embodiments, the automated querying, gathering, and analysis of information regarding the components of data center allows the data center to be maintained and improved in real-time, increasing the efficiency of data center 10 and decreasing downtime.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
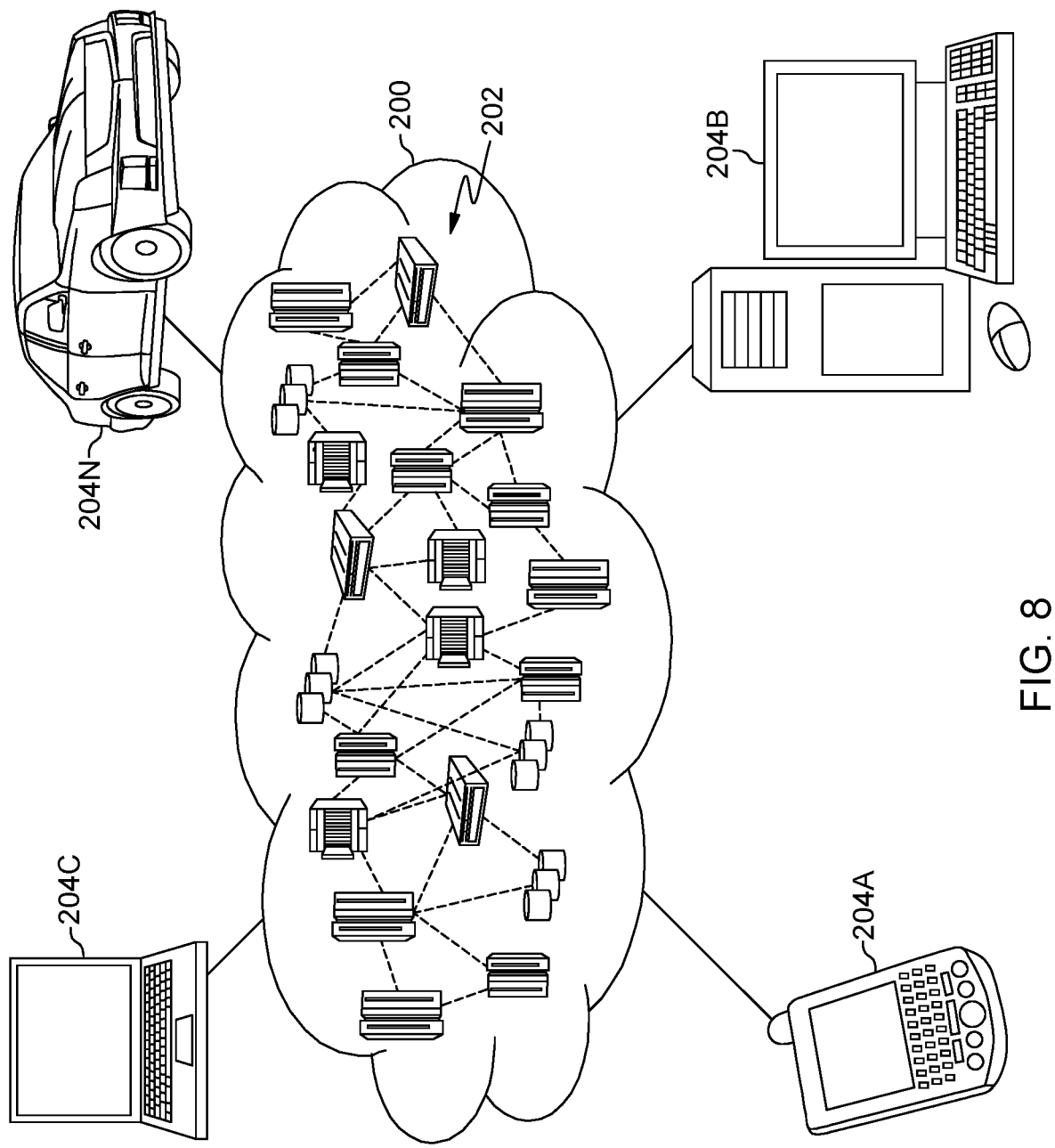

FIG. 8 shows cloud computing environment 200 that IoT holder 14' and/or assessor 18 (shown in FIG. 3) could interact with and/or be a member of. In the illustrated embodiment, cloud computing environment 200 includes one or more cloud computing nodes 202 with which local computing devices used by cloud consumers, such as, for example, personal digital assistant (PDA) or cellular telephone 204A, desktop computer 204B, laptop computer 204C, and/or automobile computer system 204N may communicate. Nodes 202 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 204A-N shown in FIG. 8 are intended to be illustrative only and that computing nodes 202 and cloud computing environment 200 can communicate with any type of computerized device over any type of network and/or network addressable connection (e.g., using a web browser).

Figure 9:
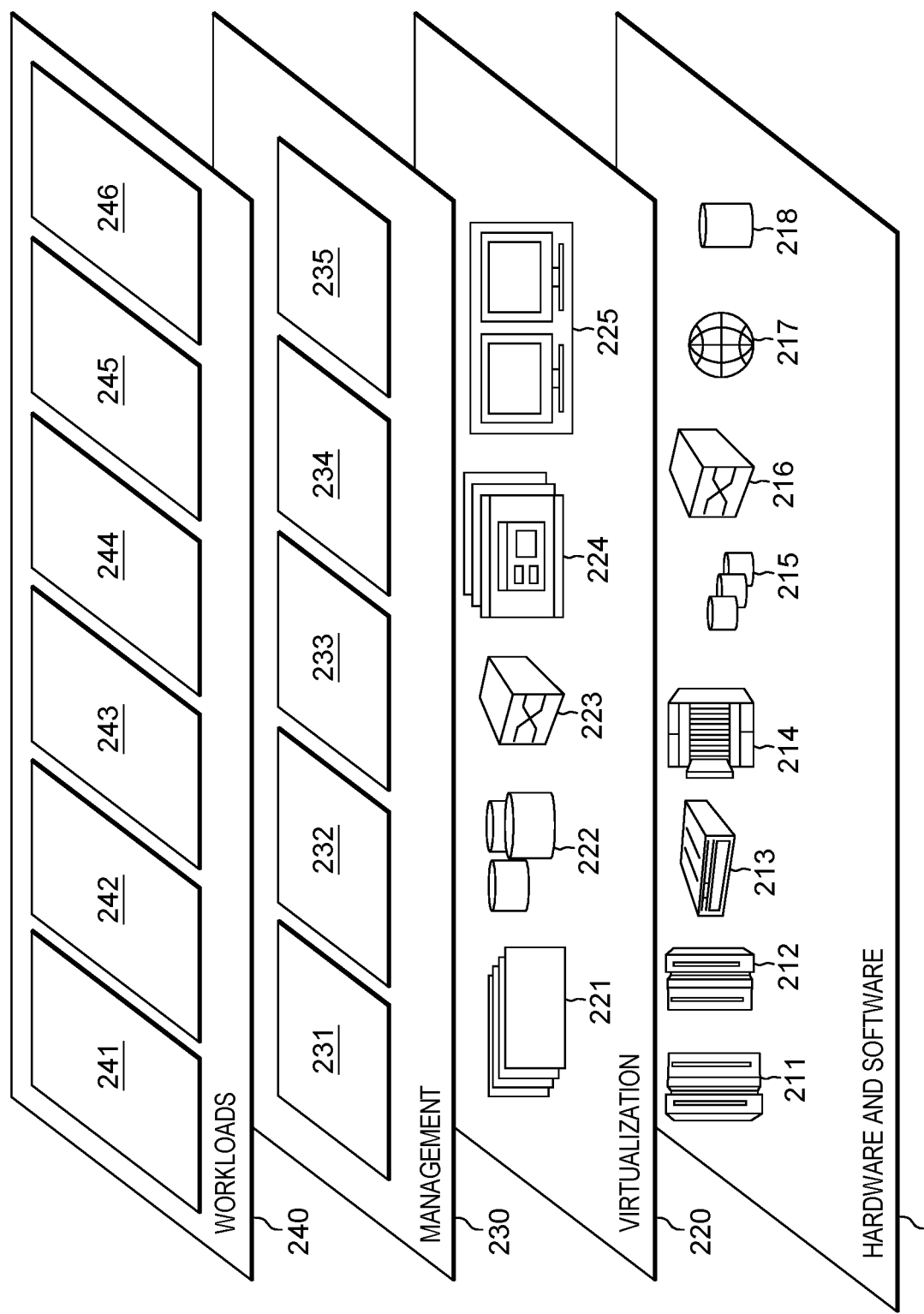
FIG. 9 shows abstraction model layers of the cloud computing environment.

FIG. 9 shows functional abstraction layers provided by cloud computing environment 200 (shown in FIG. 8). It should be understood in advance that the components, layers, and functions shown in FIG. 9 are intended to be illustrative only and embodiments of the invention are not limited thereto. As depicted, the following layers and corresponding functions are provided:

Hardware and software layer 210 includes hardware and software components. Examples of hardware components include: mainframes 211; RISC (Reduced Instruction Set Computer) architecture based servers 212; servers 213; blade servers 214; storage devices 215; and networks and networking components 216. In some embodiments, software components include network application server software 217 and database software 218.

Virtualization layer 220 provides an abstraction layer from which the following examples of virtual entities may be provided: virtual servers 221; virtual storage 222; virtual networks 223, including virtual private networks; virtual applications and operating systems 224; and virtual clients 225.

In one example, management layer 230 may provide the functions described below. Resource provisioning 231 provides dynamic procurement of computing resources and other resources that are utilized to perform tasks within the cloud computing environment. Metering and Pricing 232 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 233 provides access to the cloud computing environment for consumers and system administrators. Service level management 234 provides cloud computing resource allocation and management such that required service levels are met. Service Level Agreement (SLA) planning and fulfillment 235 provide pre-arrangement for, and procurement of, cloud computing resources for which a future requirement is anticipated in accordance with an SLA.

Workloads layer 240 provides examples of functionality for which the cloud computing environment may be utilized. Examples of workloads and functions which may be provided from this layer include: mapping and navigation 241; software development and lifecycle management 242; virtual classroom education delivery 243; data analytics processing 244; transaction processing 245; and querying, analyzing, and/or notifying 246 of information regarding a device in data center 10 (shown in FIG. 1A).

Figure 10A:
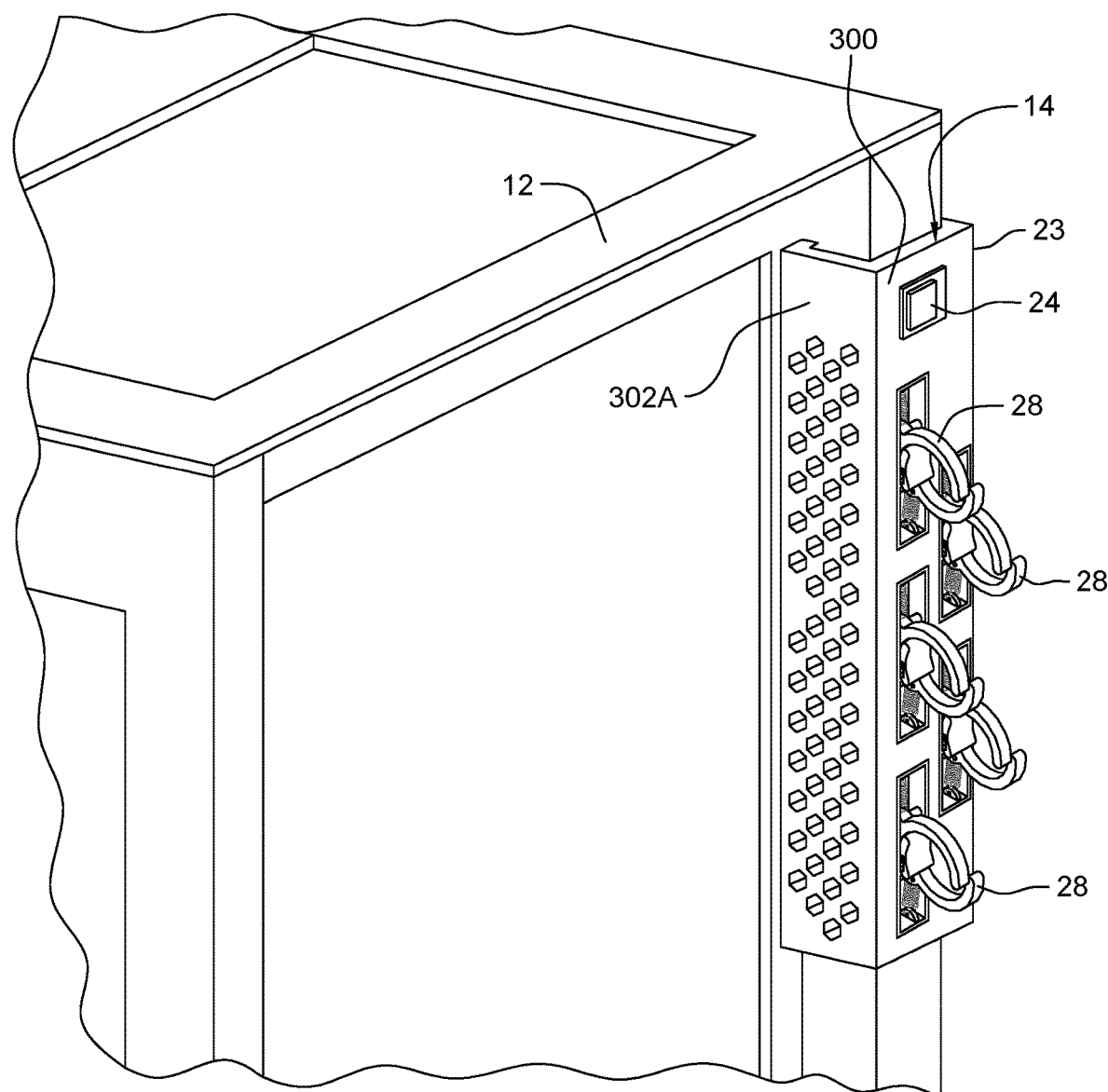
FIG. 10A shows a perspective view of the cognitive thermal cable holder.
Figure 10B:
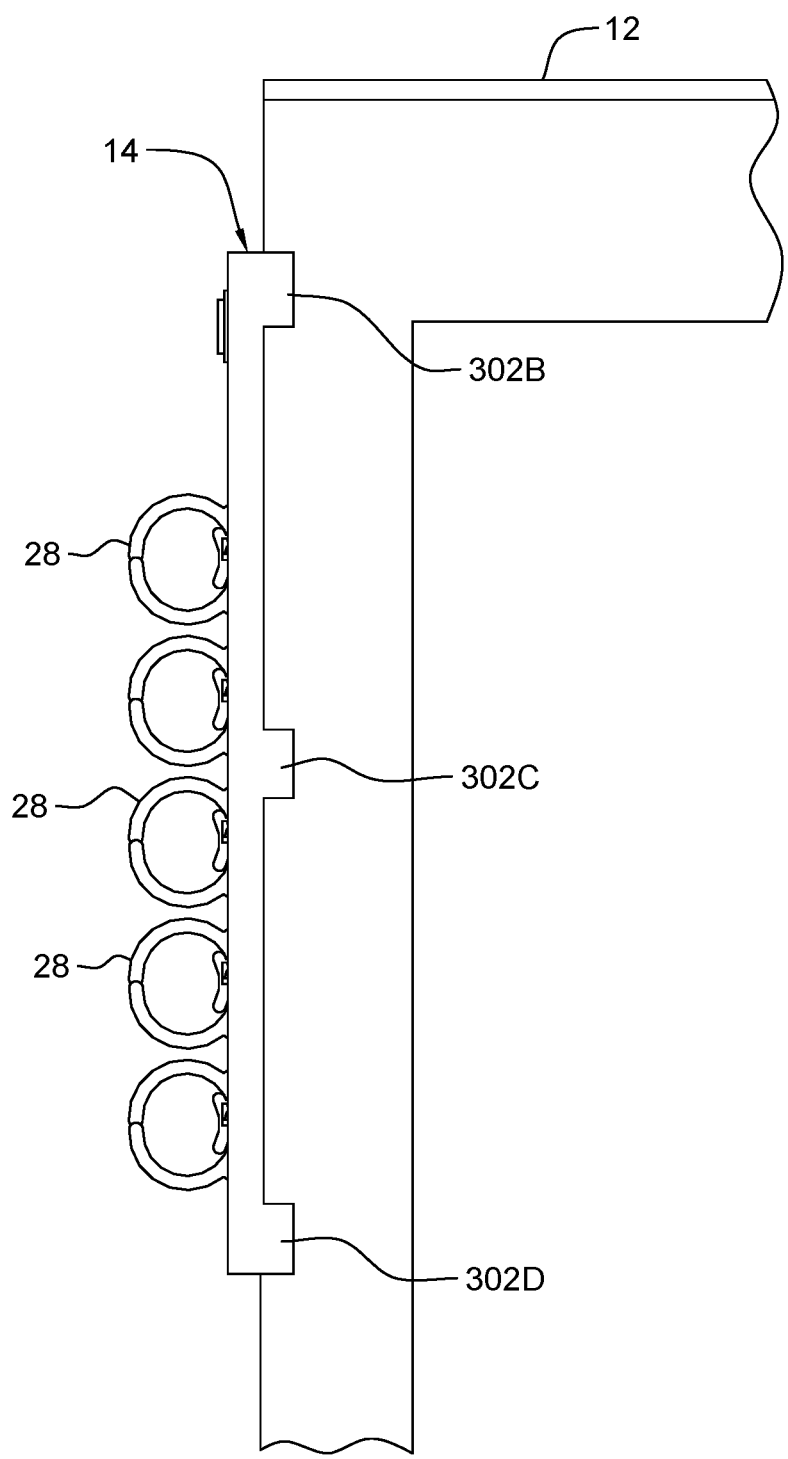
FIG. 10B shows another perspective view of the cognitive thermal cable holder.

FIG. 10A shows a perspective view of cognitive thermal cable holder 14. FIG. 10B shows another perspective view of cognitive thermal cable holder 14. FIGS. 10A and 10B will now be discussed simultaneously.

As stated previously, holder 14 comprises body 23, electronics package 24, and a plurality of holder assemblies 28. In the illustrated embodiment, body 23 comprises face 300 to which electronics package 24 and holder assemblies 28 are connected. Body 23 further includes tab 302A that extends perpendicularly to face 300 along the entire length of one edge of face 300. On the other edge of face 300, three tabs 302B-D extend perpendicularly to face 300 along only a portion thereof each. Thereby, body 23 has a "C" shape for attaching to rack 12.

In the illustrated embodiment, electronics package 24 is positioned between the upper end of body 23 and holder assemblies 28 on face 300. Holder assemblies 28 are positioned in face 300 in two vertical, staggered columns such that each holder assembly 28 is positioned partially alongside at least one other holder assembly 28 and is below and/or above another holder assembly 28. This arrangement allows for a greater number of holder assemblies 28 to be present without interfering with each other or being redundant by holding the same cables 22 (shown in FIG. 1B) in multiple holder assemblies 28.

Figure 11A:
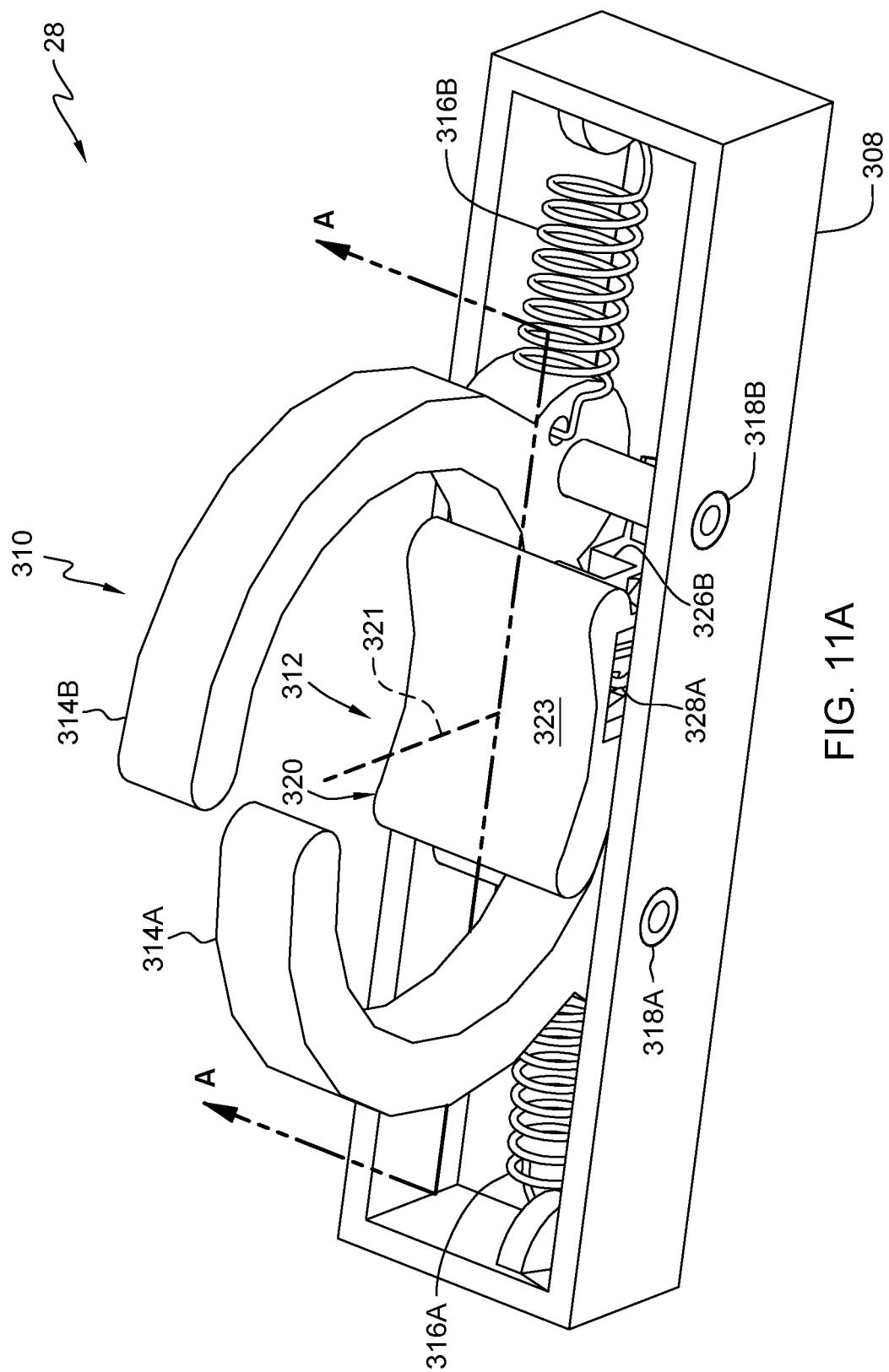
FIG. 11A shows a perspective view of a holder assembly of the cognitive thermal cable holder.
Figure 11B:
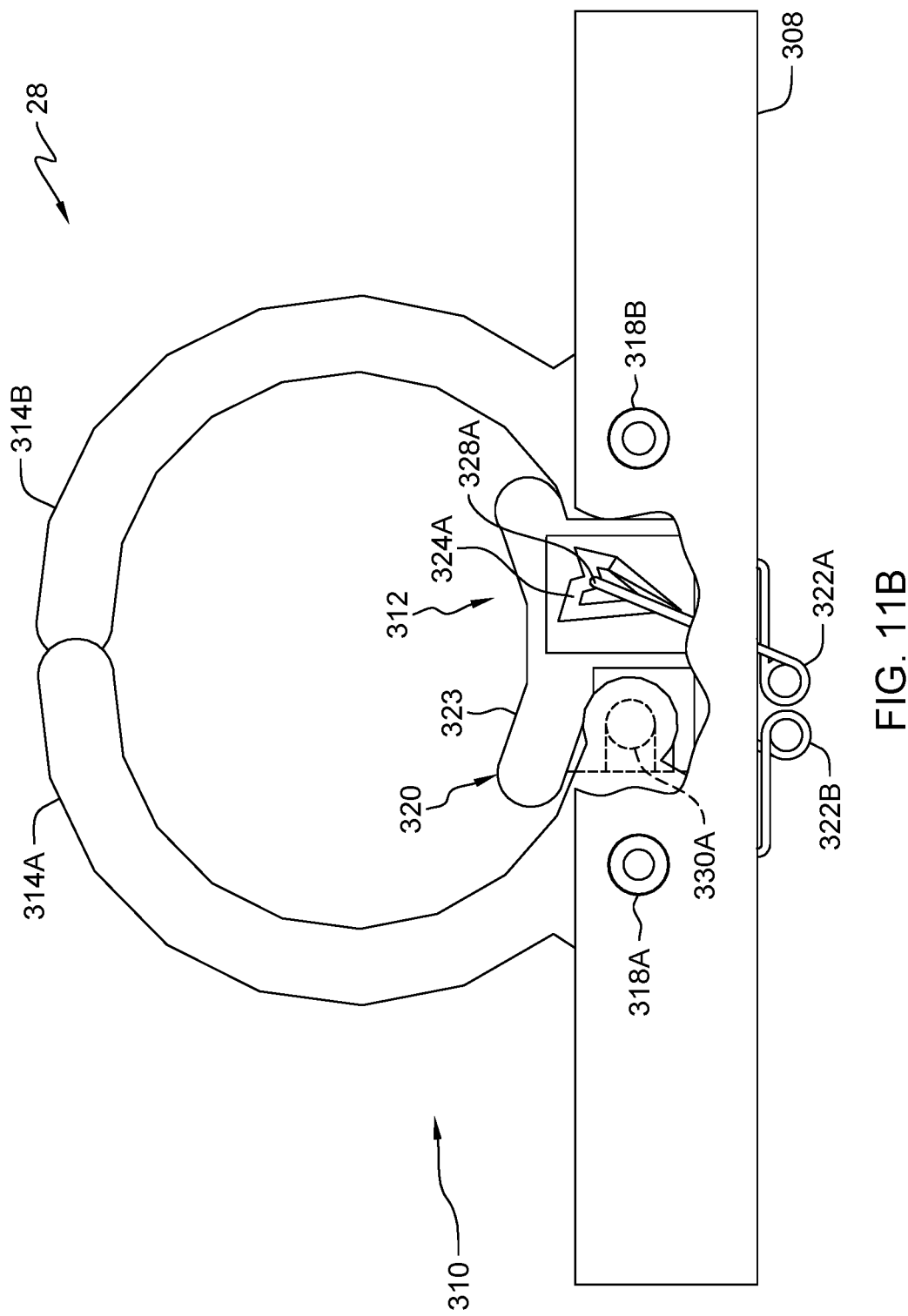
FIG. 11B shows a side view of the holder assembly of FIG. 10A in a closed position, with a broken-out section showing additional detail of a button assembly.

FIG. 11A shows a perspective view of one holder assembly 28 of cognitive thermal cable holder 14 (shown in FIG. 10A). FIG. 11B shows a side view of the holder assembly 28 in a closed position, with a broken-out section showing additional detail of button assembly 312. FIG. 11C shows a side view of holder assembly 28 in an opened position, with a broken-out section showing additional detail of button assembly 312. FIGS. 11A-11C will now be discussed simultaneously, and because they primarily depict only one side of holder assembly 28, some of the components and features will not be visible until FIGS. 13A-13C. In some embodiments, the depicted holder assembly 28 represents all holder assemblies of holder 14. Although, in other embodiments, holder 14 may include other holder assemblies with different components and configurations in addition to or instead of the depicted holder assembly 28.

In the illustrated embodiment, holder assembly 28 comprises body insert 308, claw assembly 310, and button assembly 312. Body insert 308 allows for ease of assembly and replacement of holder assembly 28, although in some embodiments, claw assembly 310 and button assembly 312 are directly fitted to body 23 (shown in FIG. 10A). Claw assembly 310 comprises hooks 314A and 314B, extension springs 316A and 316B, and pins 318A and 318B. Hook 314A is pivotably connected to body insert 308 via pin 318A, and hook 314B is pivotably connected to body insert 308 via pin 318B. Hook 314A is also connected to extension spring 316A which is a biasing member that biases hook 314A towards the opened position (as shown in FIG. 11C). Hook 314B is also connected to extension spring 316B which is a biasing member that biases hook 314B towards the opened position. The concave surface of hook 314A faces the concave surface of hook 314B, hook 314A is offset from hook 314B, and pin 318A extends parallel to pin 318B. Therefore, the ends of hooks 314A and 314B that are outward (i.e., distal) from pins 318A and 318B, respectively, in the opened position become proximal to or alongside each other when holder assembly is in the closed position (as shown in FIG. 11B) to form a substantially closed loop.

In the illustrated embodiment, button assembly 312 comprises button 320 and torsion springs 322A and 322B. Button 320 is slidably positioned in body insert 308 such that button 320 can move along button axis 321, wherein button axis 321 is perpendicular to the lengths of pins 318A and 318B. Button 320 is positioned between the outward ends of hooks 314A and 314B and body insert 308 when holder assembly 28 is in the closed position, although button 320 is positioned between the inward ends of hooks 314A and 314B regardless of whether they are opened or closed. Button 320 includes pressing face 323 on the outer side and two ratchet grooves 324A and 324B (shown in FIG. 13C) that are positioned on the opposite sides of button 320 facing body insert 308. Button further includes hook grooves 326A and 326B which primarily extend into button 320 from the same directions as ratchet grooves 324A and 324B, respectively, although hook grooves 326A and 326B also extend through the sides of button 320 that face hooks 314A and 314B, respectively. In the embodiment shown in FIGS. 11A-11C, the shape of button 320, including grooves 324A, 324B, 326A, and 326B, has rotational symmetry of order two about button axis 321 (i.e., button 320 has the same shape if rotated 180 degrees on button axis 321).

In the illustrated embodiment, torsion springs 322A and 322B are each biasing members that are connected at one end to body insert 308 and include pawls 328A and 328B (shown in FIG. 13B) at the opposite ends, respectively. Pawls 328A and/or 328B can be integral with torsion springs 322A and/or 322B, respectively (e.g., being the ends of torsion springs 322A and 322B that are bent perpendicularly to the arm that they are a part of, as shown in FIGS. 11A-11C, 13B, and 13C), or pawls 328A and/or 328B can be separate components (not shown) that are connected to torsion springs 322A and/or 322B, respectively. Pawl 328A is biased laterally towards hook 314A (counterclockwise away from hook 314B as shown in FIGS. 11A-11C), and pawl 328B is biased laterally towards hook 314B (clockwise away from hook 314A as shown in FIGS. 11A-11C). In addition, pawls 328A and 328B are biased inward towards the center of button 320 such that pawls 328A and 328B engage ratchet grooves 324A and 324B, respectively, of button 320. This allows pawls 328A and 328B to limit and control the movement of button 320 along button axis 321.

Figure 13A:
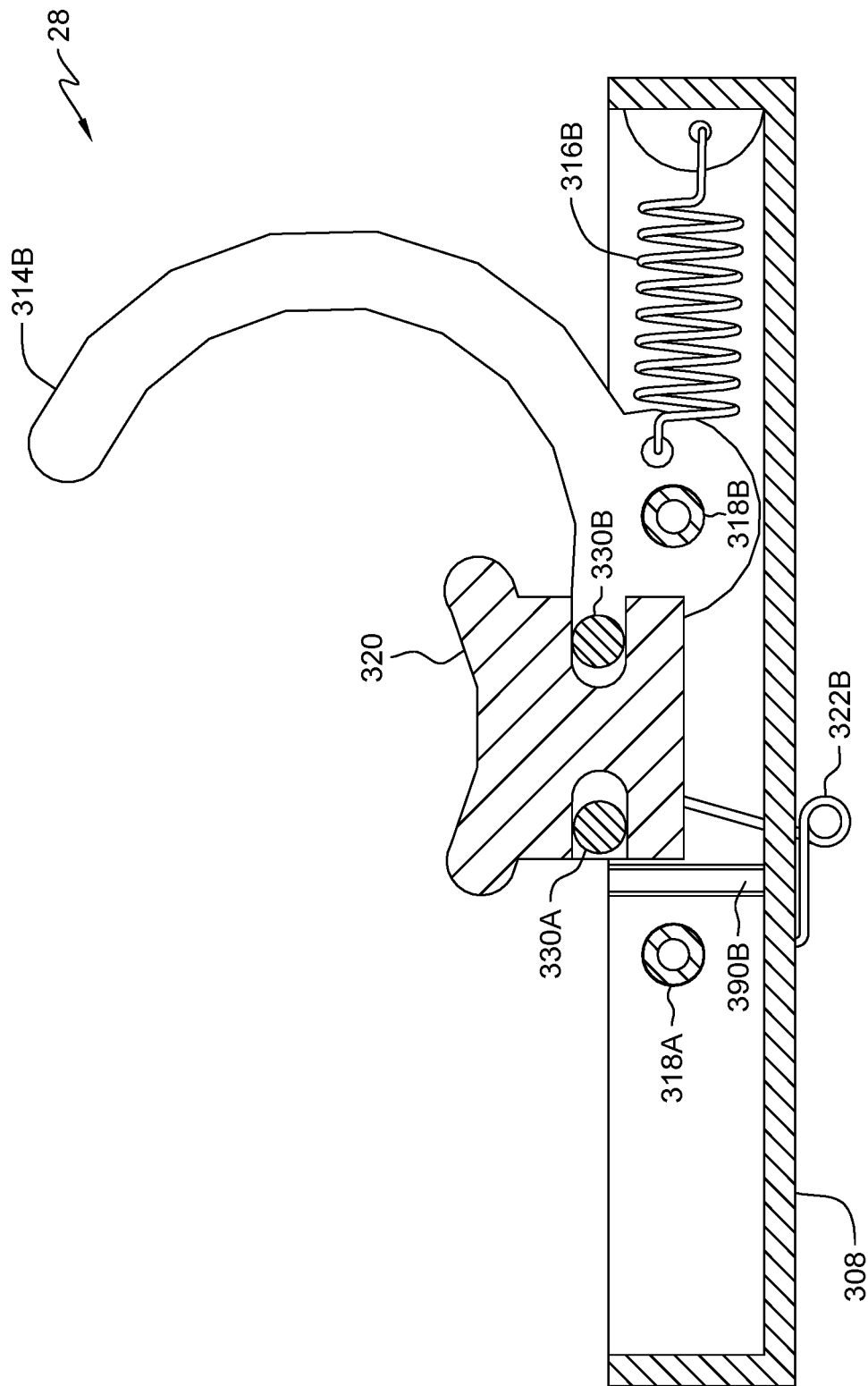
FIG. 13A shows a cross-sectional view of the holder assembly along line A-A in FIG. 11A.
Figure 13B:
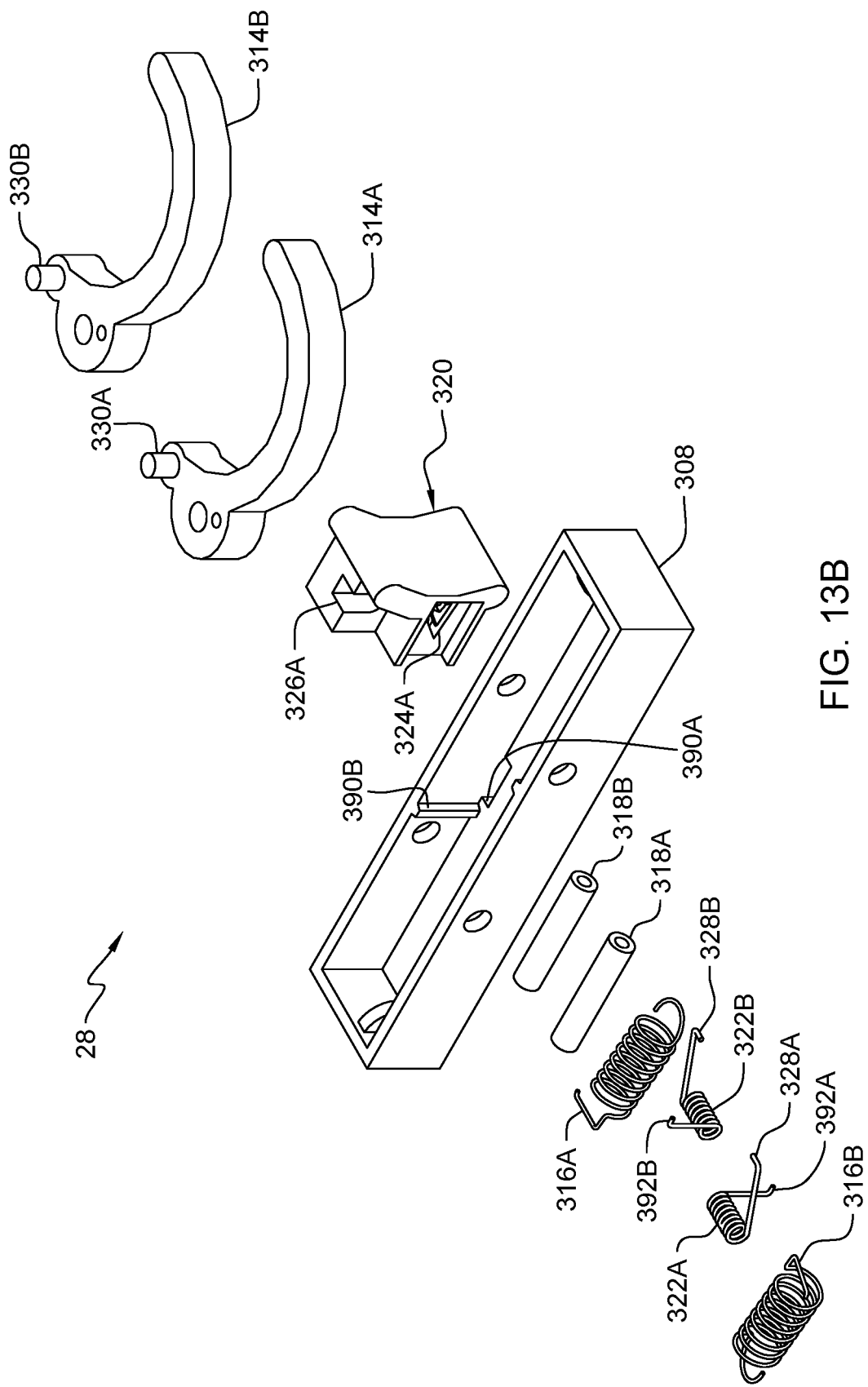
FIG. 13B shows an exploded view of one side of the holder assembly components of FIG. 11A.

In the illustrated embodiment, claw assembly 310 and holder assembly 312 are connected to each other at lugs 330A and 330B (shown in FIG. 13B). Lugs 330A and 330B are cylindrical protrusions from the central sides of proximal ends of hooks 314A and 314B that are slidably positioned in hook grooves 326A and 326B, respectively. The inward and outward surfaces of hook grooves 326A and 326B contact lugs 330A and 330B to control the movement of hooks 314A and 314B, respectively. More specifically, when button 320 is in the closed position, hooks 314A and 314B are also in the closed position. In addition, because lugs 330A and 330B are positioned on the inner sides of hooks 314A and 314B from pins 318A and 318B and because extension springs 316A and 316B urge hooks 314A and 314B into the opened position, respectively, lugs 330A and 330B urge button 320 outward towards the opened position.

The components and configuration of holder assembly 28 allow for button 320 to move holder 28 between the closed position and the opened position. Depicted in FIGS. 11A-11C is one embodiment of the present disclosure, to which there are alternative embodiments. For example, in some embodiments there is only one hook, one extension spring, and one pin. In some such embodiments, the hook is long enough to form a substantially closed loop with the body. In some such embodiments, a post (not shown) is erected that extends outward from the body or body insert, with which the hook forms a closed loop. For another example, in some embodiments, there is only one pawl and one ratchet groove. In such an embodiment, the pawl and the ratchet groove would be on the same side of the button and the button would no longer have second order rotational symmetry.

Figure 12:
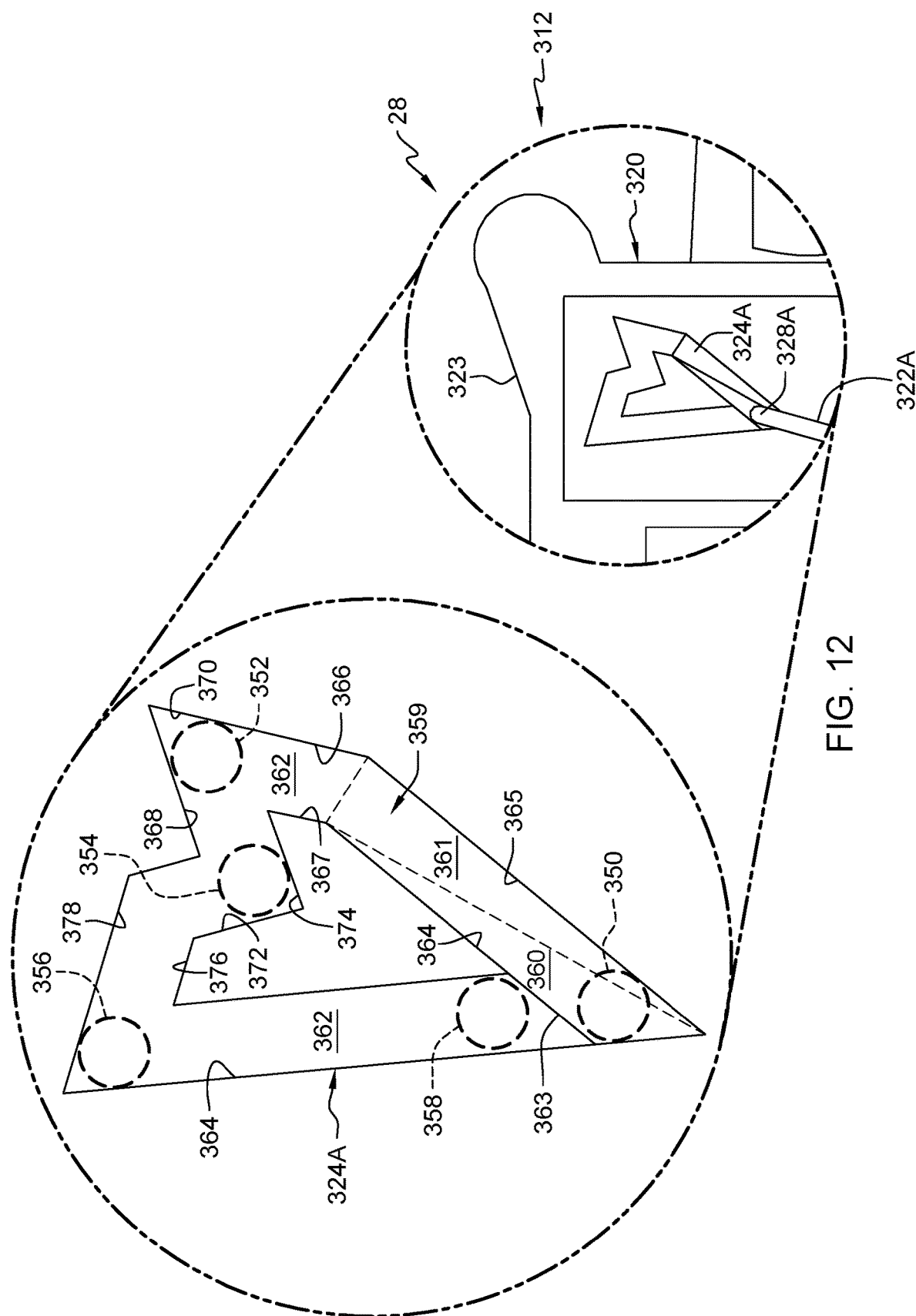
FIG. 12 shows a perspective view from section B of FIG. 11C of a button associated with the button assembly with an enlarged side view of a groove in the button with five pawl positions marked therein.

FIG. 12 shows a perspective view from section B of FIG. 11C of button 320 associated with button assembly 312 with an enlarged side view of ratchet groove 324A with five pawl positions 350-358 marked therein. Although only the "A" side of button assembly 312 is visible in FIG. 12, the "B" (opposite) side of button assembly 312 may be the same (e.g., ratchet groove 324B may be the same as ratchet groove 324A and have equivalent positions therein for pawl 328B). For the sake of simplicity, only the "A" side will be discussed with respect to FIG. 12, even though the same activities may be occurring on the "B" side.

In the illustrated embodiment, when pawl 328A is in position 350, then holder assembly 28 is in the opened position. In the opened position, for example, user 154 (shown in FIG. 3) can insert cable(s) 22 (shown in FIG. 2) into holder assembly 28. As stated previously, button 320 is biased outward (in the upward direction in FIG. 12) by extension springs 316A and 316B (shown in FIG. 11A), so pawl 328A prevents button 320 from exiting body insert 308 when pawl 328A is in position 350 by contacting surfaces 364 and 365.

Position 350 is also deeper than the other portions of ratchet groove 324A such that pawl 328A extends further in toward the center of button 320 at position 350 than positions 352-358. This is because the bottom surface 359 of ratchet groove 324A includes deep portion 360, ramp portion 361, and plateau portion 362. While ratchet groove 324A is a closed loop, there is discontinuity 363 in depth between position 350 and position 358. As stated previously, pawl 328A is biased towards hook 314A (shown in FIG. 11A), which is to the left in FIG. 12. But because of the abrupt depth change in ratchet groove 324A, pawl 328A cannot move directly from position 350 to position 358 as button 320 is pushed inward (in the downward direction in FIG. 12), for example, by user 154 (shown in FIG. 3). Instead, groove side 366 forces pawl 328A away from hook 314A as button 320 (and ratchet groove 324A) are pressed inward. Button 320 is pressed inward, pawl 328A is forced out (away from the center of button 320) by ramp portion 363 of ratchet groove 324A.

In the illustrated embodiment, once button 320 is pressed sufficiently inward, pawl 328A reaches plateau portion 362, which is a relatively long, constant depth section of bottom surface 359. In addition, pawl 328A transitions to being contacted by groove side 367 and then jumps to being contacted by groove side 368. Despite the bias of torsion spring 322A, the gap between groove side 367 and groove side 368 is insufficient to allow pawl 328A to pass through given that pawl 328A moves in an arc dictated by torsion spring 322A. When pawl 328A reaches position 352, pawl 328A prevents button 320 from moving farther inward by contacting groove sides 368 and 370. At this point, user 154 releases button 320, so button 320 is urged outward and pawl 328A travels along groove side 368 and then jumps to groove side 372. Despite the bias of torsion spring 322A, the gap between groove side 368 and groove side 3372 is insufficient to allow pawl 328A to pass through given that pawl 328A moves in an arc dictated by torsion spring 322A. Button 320 continues to move outward until pawl 328A reaches position 354, wherein pawl 328A prevents button 320 from moving farther outward by contacting groove sides 372 and 374. Thereby button 320 (and thus holder assembly 28) is held in the closed position (as shown in FIG. 11B).

When user 154 desires to remove some or all of cables 22 from or add more cables 22 to holder assembly 28, user 154 can press on button 320, for example, with a finger or cable(s) 22. At first, pawl 328A would be contacted by groove side 372, and once button 320 is pressed sufficiently inward, pawl 328A transitions to being contacted by groove side 376. Then pawl 328A jumps to being contacted by groove side 364. When pawl 328A reaches position 356, pawl 328A prevents button 320 from moving farther inward by contacting groove sides 364 and 378. Once user 154 releases pressure from pressing face 323, button 320 travels outward until pawl 328A passes discontinuity 363 and is forced into position 350 again. Thereby, holder assembly 28 is in the opened position again.

The components and configuration of button assembly 312 allow for holder assembly 28 to be moved between the opened position and the closed position by pressing button 320 inward toward body 23 (shown in FIG. 10A). Because only a pressing action is required to control holder assembly 28, holder assembly 28 can be opened even if claw assembly is significantly full of cables 22 because user 154 can use a cable 22 to contact button 320. Even if little to no cables 22 are present, only the simple motion of pressing a single spot on button 320 towards rack 12 (shown in FIG. 10A) will open or close holder assembly 28.

Figure 13C:
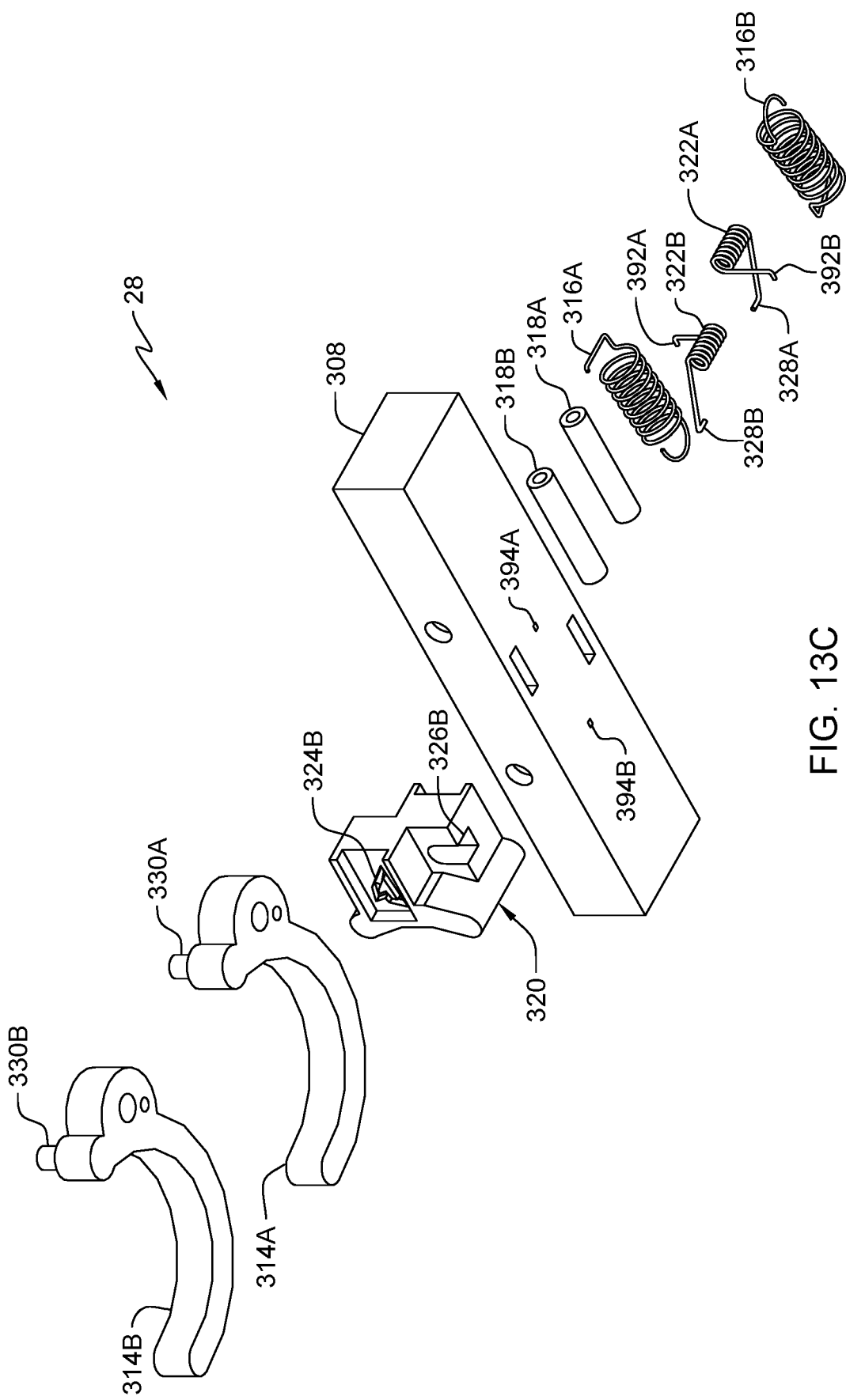
FIG. 13C shows an exploded view of another side of the holder assembly components of FIG. 11A.

FIG. 13A shows a cross-sectional view of holder assembly 28 along line A-A in FIG. 11A. FIG. 13B shows an exploded view of one side of the components of holder assembly 28 of FIG. 11A. FIG. 13C shows an exploded view of another side of the components of holder assembly 28 of FIG. 11A. More specifically, FIGS. 13A, 13B, and/or 13C show body insert 308, hooks 314A and 314B, extension springs 316A and 316B, pins 318A and 318B, button 320, torsion springs 322A and 322B, ratchet grooves 324A and 324B, hook grooves 326A and 326B, pawls 328A and 328B, and lugs 330A and 330B to add additional clarity to the foregoing Figures and Detailed Description.

Furthermore, in the illustrated embodiment, body insert 308 comprises rails 390A and 390B which help stabilize button 320 as it moves with respect to body insert 308. Also shown are studs 392A and 392B, which are integral with torsion springs 322A and/or 322B, respectively (e.g., being the ends of torsion springs 322A and 322B that are bent perpendicularly to the arm that they are a part of). Studs 392A and 392B engage with ports 394A and 394B in body insert 308 to connect torsion springs 322A and 322B to body insert 308, respectively. In some embodiments, studs 392A and/or 392B can be separate components (not shown) that connect torsion springs 322A and/or 322B to body insert 308.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A computer-implemented method for managing a data center that is temperature controlled using a thermal management system, the computer-implemented method comprising:
    collecting ambient temperature data in the data center;
    collecting server temperature data in a plurality of servers located in the data center;
    collecting rack temperature data at a plurality of server racks located in a data center using a plurality of rack temperature sensors wherein each of the plurality of rack temperature sensor is associated with one of the plurality of server racks, wherein at least one of the plurality of server racks includes at least two of the plurality of servers;
    retrieving, by a cable holder that includes a computer system, a server specification of a particular server;
    analyzing the ambient temperature data, the server temperature data, and the rack temperature data to discover a cause of a fault in the data center using a troubleshooting table that includes scenarios correlated to at least one value of each of the ambient temperature data, the server temperature data, and the rack temperature data, wherein the troubleshooting table includes causes of faults associated with the scenarios, wherein the analyzing comprises:
        comparing the server temperature data related to the particular server with the server specification of the particular server to determine whether there is a temperature anomaly;
        discovering a temperature anomaly;
        matching the temperature anomaly to a scenario in the troubleshooting table; and
        selecting the cause, from the group consisting of the thermal management system, the plurality of servers, and the plurality of rack temperature sensors, based on the troubleshooting table; and
    generating a notification regarding the cause of the fault.

2. The method of claim 1, further comprising:
    displaying a graphical thermal map using at least one of the group consisting of: the ambient temperature data, the server temperature data, and the rack temperature data.

3. The method of claim 1, wherein the notification is selected from the group consisting of the cause of the fault, an action to mitigate the fault, an action to remediate the fault, and an alert for a service provider for the cause of the fault.

4. The method of claim 1, further comprising:
    collecting data regarding a specification of a device related to the data center, the device being selected from the group consisting of: one of the plurality of servers and a component of the thermal management system; and
    querying a remote third-party source for information about the device using the specification.

5. The method of claim 1, wherein the ambient temperature data is measured using an ambient temperature sensor in the data center.

6. The method of claim 1, wherein the cause is selected from the group consisting of the thermal management system and the plurality of servers.

7. A method of managing a data center comprising a plurality of racks, at least some of the racks including at least one of a plurality of servers, wherein an ambient temperature in the data center is controlled by a thermal management system, the method comprising:
- measuring a server temperature in one of the plurality of servers;
- measuring a rack temperature at one of the plurality of racks that is associated with the one of the plurality of servers;
- measuring the ambient temperature in the data center;
- retrieving, by a cable holder that includes a computer system, a server specification of the one of the plurality of servers;
- sending the server temperature, the rack temperature, and the ambient temperature to be analyzed in real-time to discover a cause of a fault related to the data center using a troubleshooting table that includes scenarios correlated to at least one value of each of the ambient temperature data, the server temperature data, and the rack temperature data, wherein the troubleshooting table includes causes of faults associated with the scenarios, and wherein the cause is selected from the group consisting of the thermal management system, the one of the plurality of servers, and the one of the plurality of racks, and wherein the analysis comprises:
  - comparing the server temperature data related to the particular server with the server specification of the particular server to determine whether there is a temperature anomaly;
  - discovering a temperature anomaly;
  - matching the temperature anomaly to a scenario in the troubleshooting table; and
  - selecting the cause from the group based on the troubleshooting table; and
- receiving a notification regarding the cause of the fault.

8. The method of claim 7, further comprising:
- displaying a graphical thermal map using at least one of the ambient temperature, the server temperature, and the rack temperature.

9. The method of claim 7, further comprising:
- alerting an administrator of the data center as to the cause of the fault.

10. The method of claim 7, further comprising:
- storing a specification of a device related to the data center, the device being selected from the group consisting of: one of the plurality of servers and a component of the thermal management system; and
- querying a remote third-party source for information about the device using the specification.

11. The method of claim 10, further comprising:
- alerting an administrator of the data center of preventative action that can be taken on the device based on a result of the querying.

12. The method of claim 7, further comprising:
- connecting a cable holder to the one of the plurality of racks, wherein the cable holder comprises a temperature sensor that senses the rack temperature; and
- placing a cable connected to the one of the plurality of servers into a claw of the cable holder.

13. An apparatus comprising:
- a body;
- a cable holder connected to the body;
- a temperature sensor connected to the body;
- a transmitter connected to the body and communicatively connected to a third-party source of information about assets related to a data center wherein the data center includes a thermal management system; and
- a processor communicatively connected to the transmitter, wherein the processor is configured to perform the steps of:
  - collecting ambient temperature data in the data center;
  - collecting server temperature data in a plurality of servers located in the data center;
  - collecting rack temperature data at a plurality of server racks located in a data center using a plurality of rack temperature sensors wherein each of the plurality of rack temperature sensor is associated with one of the plurality of server racks, wherein each of the plurality of server racks includes at least two of the plurality of servers;
  - retrieving, by a cable holder that includes a computer system, a server specification of a particular server; and
  - analyzing the ambient temperature data, the server temperature data, and the rack temperature data to discover a cause of a fault in the data center using a troubleshooting table that includes scenarios correlated to at least one value of each of the ambient temperature data, the server temperature data, and the rack temperature data, wherein the troubleshooting table includes causes of faults associated with the scenarios, and wherein the cause is selected from the group consisting of the thermal management system, the plurality of servers, and the plurality of rack temperature sensors, wherein the analyzing comprises:
    - comparing the server temperature data related to the particular server with the server specification of the particular server to determine whether there is a temperature anomaly;
    - discovering a temperature anomaly;
    - matching the temperature anomaly to a scenario in the troubleshooting table; and
    - selecting the cause from the group based on the troubleshooting table.

14. The apparatus of claim 13, wherein the equipment related to the data center is selected from the group comprising: server hardware, server software, thermal management system hardware, and thermal management system software.

15. The apparatus of claim 13, wherein the cable holder comprises a plurality of claws for securing a plurality of cables.

16. The apparatus of claim 13, further comprising:
- a processor communicatively connected to the transmitter, wherein the processor is further configured to perform the steps of:
  - generating a notification regarding the cause of the fault.

* * * * *